(12) United States Patent
Funaki et al.

(10) Patent No.: US 6,855,787 B2
(45) Date of Patent: Feb. 15, 2005

(54) MULTI-LAYER HOSE

(75) Inventors: Atsushi Funaki, Chiba (JP); Naoko Sumi, Chiba (JP); Eiichi Nishi, Chiba (JP); Noriyuki Isobe, Yamaguchi (JP); Tomoharu Nishioka, Yamaguchi (JP); Koji Nakamura, Yamaguchi (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/617,663

(22) Filed: Jul. 14, 2003

(65) Prior Publication Data
US 2004/0191440 A1 Sep. 30, 2004

(30) Foreign Application Priority Data
Mar. 31, 2003 (JP) ........................................ 2003-095570

(51) Int. Cl.$^7$ ........................ C08F 214/18; B29D 22/00
(52) U.S. Cl. ........................ 526/250; 526/348; 526/242; 526/323; 526/317.1; 428/36.9; 428/36.91
(58) Field of Search ................................ 526/250, 348, 526/242, 323, 317.1; 428/36.9, 36.91

(56) References Cited

U.S. PATENT DOCUMENTS

| | | | |
|---|---|---|---|
| 4,746,704 A | | 5/1988 | Bergström et al. |
| 5,554,425 A | | 9/1996 | Krause et al. |
| 5,736,610 A | * | 4/1998 | Nishi et al. .................. 525/276 |
| 2003/0035914 A1 | * | 2/2003 | Nishi et al. ............... 428/36.91 |
| 2003/0162923 A1 | * | 8/2003 | Funaki et al. ................ 526/250 |

FOREIGN PATENT DOCUMENTS

| | | |
|---|---|---|
| EP | 0 637 511 | 2/1995 |
| EP | 1 152 034 | 11/2001 |
| JP | 7-53823 | 2/1995 |
| JP | 7-173446 | 7/1995 |
| JP | 9-194815 | 7/1997 |
| JP | 2002-357285 | 12/2002 |
| WO | WO 98/55557 | 12/1998 |

OTHER PUBLICATIONS

Derwent Publications, XP–002259528, JP 05–051417, Mar. 2, 1993.

* cited by examiner

*Primary Examiner*—Ling-Sui Choi
(74) *Attorney, Agent, or Firm*—Oblon, Spivak, McClelland, Maier & Neustadt, P.C.

(57) ABSTRACT

A multi-layer hose having a multi-layer structure comprising an inner layer (I) made of a fluorocopolymer and an outer layer (II) made of a polyamide resin, wherein the fluorocopolymer constituting the inner layer (I) is a fluorocopolymer which comprises polymerized units (a) based on tetrafluoroethylene, polymerized units (b) based on ethylene and polymerized units (c) based on itaconic anhydride and/or citraconic anhydride, wherein the molar ratio of (a)/(b) is from 20/80 to 80/20 and the molar ratio of (c)/((a)+(b)) is from 1/10,000 to 5/100 and which has a volume flow rate of from 1 to 1,000 mm$^3$/sec., and the polyamide resin constituting the outer layer (II) is polyamide 11 and/or polyamide 12, which satisfies a condition of (terminal amino group concentration)/(terminal carboxyl group concentration)>1.

12 Claims, No Drawings

MULTI-LAYER HOSE

The present invention relates to a multi-layer hose which is excellent in the interlayer adhesion strength and the fuel barrier property and which exhibits fuel resistance of the excellent interlayer adhesion strength over a long period of time.

With respect to piping hoses for automobiles, the main base material has been changed from a metal to a resin which is light in weight and excellent in the anti-corrosion, in view of a problem of corrosion by an anti-freezer applied to roads in the past and in view of the demand for energy conservation as an urgent need to prevent global warming in recent years. As a resin to be used for piping hoses, a polyamide resin, a saturated polyester resin, a polyolefin resin or a thermoplastic polyurethane resin may, for example, be usually mentioned. However, in the case of a single layer hose made of such a resin, the heat resistance, chemical resistance, etc. are inadequate, whereby the range of its application has been rather limited.

On the other hand, a fluorinated resin is excellent in the heat resistance, chemical resistance, weather resistance, non-stickiness, low friction, low dielectric characteristics, etc., and thus is used in a wide range of fields. In particular, a multi-layer hose as e.g. a piping hose for an automobile to be used in an engine room of an automobile, which will be exposed to a severe condition of e.g. a high temperature environment, may be mentioned as a particularly important application.

Piping hoses for automobiles are hoses for transporting a gasoline fuel containing an aromatic compound and an alcohol such as ethanol or methanol. In recent years, from the viewpoint of environment protection, the regulations relating to permeation of a gasoline fuel as an air pollutant from such piping hoses for automobiles, have been increasingly strict. Against such strict regulations, hoses in which a polyamide resin which has been commonly preferably used, particularly polyamide 11 and/or polyamide 12 which is excellent in strength, toughness, chemical resistance and flexibility, is used alone (in a single layer), are inadequate in the barrier property against the above-mentioned gasoline fuel (hereinafter referred to as "the fuel barrier property").

As a measure to cope therewith, a multi-layer hose having a double layer structure or the like has been proposed. Particularly for the inner layer which will be in contact directly with the fuel, it is desired to use a resin which is excellent in the chemical resistance against a corrosive solvent such as ethanol or methanol present in the fuel and excellent in the barrier property against such a solvent. From this viewpoint, as the inner layer material, a fluorinated resin excellent in the heat resistance, chemical resistance, fuel barrier property and further gas barrier property, is considered to be one of the most preferred.

Further, in a case where electrification will result by static electricity generated when a liquid fuel passes through the multi-layer hose made of a fluorinated resin, it will be required to have the generated static electricity discharged by a method of e.g. imparting an electrical conductivity to the fluorinated resin.

On the other hand, for the outer layer of the multi-layer hose, a polyamide resin such as polyamide 6, polyamide 11 or polyamide 12 having relatively good durability, is usually employed in many cases.

Such a multi-layer hose is required to have a strong interlayer adhesion strength in order to avoid delamination during processing or use. As a method to increase the adhesion strength, there may be mentioned, for example, a method wherein a fluorinated resin hose is preliminarily formed, and after carrying out surface treatment, a polyamide resin is coated thereon (e.g. U.S. Pat. No. 5,554,425), or a coextrusion method employing an adhesive resin (e.g. JP-A-7-173446). Especially, the coextrusion method employing an adhesive resin may be regarded as a low cost method, since the surface treating step is not required.

Heretofore, there has been the following problem, when it is attempted to produce a multi-layer hose having a multi-layer structure comprising an inner layer made of a fluorinated resin and an outer layer made of a polyamide resin. Namely, the fluorinated resin is inherently poor in the adhesive property, and even if a hose or film made of a fluorinated resin is covered directly with a substrate made of a polyamide resin for the outer layer, no adequate adhesion strength can be obtained. Even if adhesion strength can be obtained to some extent, the adhesion strength is likely to fluctuate depending upon the type of the polyamide resin, and thus, the adhesion strength has been practically inadequate in many cases.

Thus, it has been difficult to directly adhere the fluorinated resin of the inner layer and the polyamide resin of the outer layer. Therefore, there have been many attempts to interpose between the two layers an adhesive resin layer having adhesive properties to both of the fluorinated resin and the polyamide resin.

As such an adhesive resin to be interposed between the layers, for example, a mixture (blend) of a polyamide resin and a fluorinated resin (e.g. JP-A-7-53823), an adhesive fluorinated resin (e.g. WO98/55557) or an adhesive polyamide resin (e.g. JP-A-9-194815) has been proposed.

However, also in a multi-layer hose having such an adhesive resin layer interposed, the adhesion strength between the fluorinated resin layer and the polyamide resin has not yet been adequate.

Further, the present inventors have previously proposed to prepare a fuel hose by adopting a multi-layer structure comprising a layer made of an adhesive polyamide resin and a layer made of an ethylene/tetrafluoroethylene copolymer having an adhesive property thereto (JP-A-2002-357285).

This fuel hose is basically excellent in the adhesion strength between the layers, but two steps i.e. a polymerization step and a grafting step, are required to produce the adhesive ethylene/tetrafluoroethylene copolymer to be used. Further, if the hose is contacted with or soaked in a fuel for a long period of time, the durability of the adhesion strength between the layers (hereinafter referred to as "the fuel resistance") has not necessarily been adequate in some cases.

It is an object of the present invention to solve the above problems and to provide a multi-layer hose comprising an outer layer made of a polyamide resin and an inner layer made of a fluorinated resin, particularly an ethylene/tetrafluoroethylene copolymer, wherein the interlayer adhesion strength, particularly between the inner layer and the outer layer, is high, and which shows the fuel resistance of the excellent interlayer adhesion strength over a long period of time.

As a result of an extensive study to solve the above problems, the present inventors have found that by laminating an ethylene/tetrafluoroethylene copolymer having a specific acid anhydride copolymerized and a polyamide resin satisfying a specific terminal group-concentration condition, it is possible to obtain a multi-layer hose having a multi-layer structure of two or more layers, wherein both layers are very strongly adhered to each other. The present invention has been accomplished on the basis of such a discovery.

Namely, the present invention provides the following multi-layer hose.

A multi-layer hose having a multi-layer structure comprising an inner layer (I) made of a fluorocopolymer and an outer layer (II) made of a polyamide resin, wherein the fluorocopolymer constituting the inner layer (I) is a fluorocopolymer which comprises polymerized units (a) based on tetrafluoroethylene, polymerized units (b) based on ethylene and polymerized units (c) based on itaconic anhydride and/or citraconic anhydride, wherein the molar ratio of (a)/(b) is from 20/80 to 80/20 and the molar ratio of (c)/((a)+(b)) is from 1/10,000 to 5/100 and which has a volume flow rate of from 1 to 1,000 mm$^3$/sec., and the polyamide resin constituting the outer layer (II) is polyamide 11 and/or polyamide 12, which satisfies a condition of (terminal amino group concentration)/(terminal carboxyl group concentration)>1.

The multi-layer hose according to Item 1, wherein the fluorocopolymer constituting the inner layer (I) is a composition comprising a fluorocopolymer which comprises polymerized units (a) based on tetrafluoroethylene, polymerized units (b) based on ethylene and polymerized units (c) based on itaconic anhydride and/or citraconic anhydride, wherein the molar ratio of (a)/(b) is from 20/80 to 80/20 and the molar ratio of (c)/((a)+(b)) is from 1/10,000 to 5/100 and which has a volume flow rate of from 1 to 1,000 mm$^3$/sec., and an ethylene/tetrafluoroethylene copolymer other than the above fluorocopolymer, in a mass ratio of from 1/99 to 80/20.

Now, the present invention will be described in detail with reference to the preferred embodiments.

In the multi-layer hose of the present invention, the fluorocopolymer constituting the inner layer (I) is basically an ethylene/tetrafluoroethylene copolymer (hereinafter sometimes referred to as "ETFE") and is one having itaconic anhydride and/or citraconic anhydride copolymerized thereto.

In the present invention, the molar ratio of polymerized units (a) based on tetrafluoroethylene (hereinafter sometimes referred to as "TFE") to polymerized units (b) based on ethylene (hereinafter sometimes referred to as "E") is from 20/80 to 80/20, preferably from 50/50 to 70/30.

If the molar ratio of (a)/(b) is too small, the heat resistance, weather resistance, chemical resistance, gas barrier property, fuel barrier property, fuel resistance, etc. of the fluorocopolymer will decrease. On the other hand, if the molar ratio is too large, the mechanical strength, melt-processability, etc. will decrease. When the molar ratio is within this range, the fluorocopolymer will be excellent in the heat resistance, weather resistance, chemical resistance, fuel barrier property, gas barrier property, mechanical strength, melt processability, etc.

Further, with respect to polymerized units (c) based on itaconic anhydride and/or citraconic anhydride, the molar ratio of (c)/((a)+(b)) is from 1/10,000 to 5/100, preferably from 5/10,000 to 3/100, more preferably from 7/10,000 to 1/100, most preferably from 1/1,000 to 1/100.

If the molar ratio is too small, the adhesion to the polyamide resin decreases, and if it is too large, the fuel barrier property decreases. Accordingly, when the molar ratio is within this range, the adhesion and the fuel barrier property of the fluorocopolymer will be satisfactory. Here, itaconic anhydride and citraconic anhydride may be used alone, respectively, or may be used as a mixture. The above molar ratio represents the total amount of the two, when they are used as a mixture. Itaconic anhydride (hereinafter sometimes referred to as "IAN") and citraconic anhydride (hereinafter sometimes referred to as "CAN") to be used in the present invention may partially be hydrolyzed before the polymerization. For example, IAN may be a mixture of IAN and itaconic acid, obtained by partial hydrolysis of IAN. Likewise, CAN may be a mixture of CAN and citraconic acid, obtained by partial hydrolysis of CAN. Still further, polymerized units based on IAN or CAN in the fluorocopolymer may partially be hydrolyzed after the polymerization. Polymerized units formed by such hydrolysis before or after the polymerization are regarded as a part of polymerized units (c) in the present invention. For example, the amount of polymerized units (c) represents the total amount of polymerized units based on IAN and polymerized units based on itaconic acid formed by partial hydrolysis and IAN.

In addition to polymerized units based on the above described (a), (b) and (c), the fluorocopolymer to be used in the present invention may contain polymerized units (d) based on another monomer other than (a), (b) and (c).

Another monomer to be used here, may, for example, be a hydrocarbon olefin such as propylene or butene; a compound of the formula (1):

$$CH_2=CX(CF_2)_nY \qquad (1)$$

(wherein each of X and Y which are independent of each other, is hydrogen or a fluorine atom, and n is an integer of from 2 to 8); A fluoroolefin having a hydrogen atom in an unsaturated group, such as vinylidene fluoride, vinyl fluoride or trifluoroethylene; a fluoroolefin having no hydrogen atom in an unsaturated group such as hexafluoropropylene, chlorotrifluoroethylene or a perfluoro(alkyl vinyl ether) (provided that TFE is excluded); or a vinyl ether such as an alkyl vinyl ether, a (fluoroalkyl)vinyl ether, a glycidyl vinyl ether, a hydroxybutyl vinyl ether or a methyl vinyloxy butyl carbonate. These monomers may be used alone or in combination of two or more of them, as another monomer. Among them, a compound represented by $CH_2=CX(CF_2)_nY$ of the above formula (1) is most preferred as another monomer. In such a case, the number (n) of difluoromethylene groups in the formula, is preferably n=2 to 6, more preferably n=2 to 4, whereby the fluorocopolymer will be excellent in the fuel barrier property and cracking resistance.

Specific examples of the monomer represented by the above formula, include $CH_2=CF(CF_2)_2F$, $CH_2=CF(CF_2)_3F$, $CH_2=CF(CF_2)_4F$, $CH_2=CF(CF_2)_2H$, $CH_2=CF(CF_2)_3H$, $CH_2=CF(CF_2)_4H$, $CH_2=CH(CF_2)_2F$, $CH_2=CH(CF_2)_3F$, $CH_2=CH(CF_2)_4F$, $CH_2=CH(CF_2)_2H$, $CH_2=CH(CF_2)_3H$ and $CH_2=CH(CF_2)_4H$.

Among them, particularly preferred is $CH_2=CF(CF_2)_2F$, $CH_2=CH(CF_2)_2F$, $CH_2=CH(CF_2)_2H$ or $CH_2=CF(CF_2)_2H$. Most preferred is $CH_2=CH(CF_2)_2F$.

In a case where the fluorocopolymer contains polymerized units (d) based on such another monomer, their content is preferably from 0.01 to 20 mol %, more preferably from 0.1 to 15 mol %, still more preferably from 0.1 to 10 mol %, based on the total polymerized units in the fluorocopolymer.

The fluorocopolymer to be used in the present invention, preferably has a processing temperature close to the processing temperature of the polyamide resin, so that the multi-layer product can be formed by coextrusion using this as an inner layer, together with the polyamide resin to form an outer layer. Accordingly, it is preferred to suitably adjust the proportions of (a), (b) and (c) within the above-mentioned ranges to optimize the melting point of the fluorocopolymer in the relation with the processing temperature of the polyamide resin. Further, it is preferred to optionally incorporate (d) to better adjust the melting point of the fluorocopolymer to improve the coextrusion processability with the polyamide resin to be laminated. Still further, it is preferred to adjust the proportions of (c) and (d) to further improve the interlayer adhesion strength with the polyamide resin layer.

The volume flow rate (hereinafter referred to as "value Q") of the fluorocopolymer to be used in the present invention is from 1 to 1,000 mm³/sec. Value Q is preferably from 5 to 500 mm³/sec, more preferably from 10 to 200 mm³/sec.

Basically, value Q is an index to show the melt flowability of the fluorocopolymer and is a value which will be an index for the molecular weight. Namely, the larger value Q, the lower the molecular weight, and the smaller value Q, the higher the molecular weight. Accordingly, if value Q is too small, extrusion processing tends to be difficult. On the other hand, if it is too large, the mechanical strength of the fluorocopolymer will decrease.

In the present invention, value Q is a value measured by means of a flow tester, as will be shown in the Examples given hereinafter.

With respect to a process for producing the fluorocopolymer to be used in the present invention, there is no particularly restriction, and a polymerization method using a commonly employed radical polymerization initiator, may be adopted. The polymerization method per se known may, for example, be bulk polymerization, solution polymerization using an organic solvent such as a fluorohydrocarbon, a chlorohydrocarbon, a fluorochlorohydrocarbon, an alcohol or a hydrocarbon, a suspension polymerization using an aqueous medium and, if necessary, a suitable organic solvent, or emulsion polymerization using an aqueous medium and an emulsifier. Among them, solution polymerization is most preferred. The polymerization may be carried out in a batch system or in a continuous system using a single vessel or multi vessel-type agitation polymerization apparatus or a tubular polymerization apparatus. Here, the radical polymerization initiator is preferably one having a decomposition temperature of from 0° C. to 100° C., more preferably from 20 to 90° C., to obtain a half-life of 10 hours.

Specific examples of the preferred radical polymerization initiator include an azo compound such as azobisisobutylonitrile; a non-fluorinated diacyl peroxide such as isobutyryl peroxide, octanoyl peroxide, benzoyl peroxide or lauroyl peroxide; a peroxy dicarbonate such as diisopropyl peroxy dicarbonate; a peroxy ester such as tert-butyl peroxy pivalate, tert-butyl peroxy isobutyrate or tert-butyl peroxy acetate; a fluorinated diacyl peroxide such as a compound of the formula (2):

$$(Z(CF_2)_pCOO)_2 \quad (2)$$

(wherein Z is a hydrogen atom, a fluorine atom or a chlorine atom, and p is an integer of from 1 to 10); and an inorganic peroxide such as potassium persulfate, sodium persulfate or ammonium persulfate.

Further, it is also preferred to use a chain transfer agent to control value Q of the fluorocopolymer within the above-mentioned preferred range.

Such a chain transfer agent may, for example, be an alcohol such as methanol or ethanol; a chlorofluorohydrocarbon such as 1,3-dichloro-1,1,2,2,3-pentafluoropropane (hereinafter referred to as "AK225cb", manufactured by Asahi Glass Company, Limited) or 1,1-dichloro-1-fluoroethane; or a hydrocarbon such as pentane, hexane or cyclohexane.

Further, in such a case, it is preferred to employ a chain transfer agent having a functional group such as an ester group, a carbonate group, a hydroxyl group, a carboxyl group or a carbonyl fluoride group, whereby a terminal group having a reactivity with the polyamide resin, may be introduced. Such a chain transfer agent may, for example, be acetic acid, methyl acetate, ethylene glycol or propylene glycol.

The polymerization conditions for the fluorocopolymer to be used in the present invention are not particularly limited. The polymerization temperature is preferably from 0 to 100° C., more preferably from 20 to 90° C. Further, the polymerization pressure is preferably from 0.1 to 10 MPa, more preferably from 0.5 to 3 MPa. Further, the polymerization time is preferably from 1 to 30 hours.

If the concentration of IAN or CAN in the reaction system is too high during the polymerization, the polymerization rate tends to decrease. Accordingly, the concentration of IAN or CAN (the total concentration in a case where they are used in combination) is preferably from 0.001 to 5%, more preferably from 0.01 to 3%, most preferably from 0.01 to 1%, by a molar ratio, based on the total amount of TFE and E. If the concentration of IAN or the like is within this range, the polymerization rate will not decrease during the production, and the adhesion property of the fluorocopolymer will be good. Further, as IAN or CAN is consumed by the polymerization, in order to maintain the concentration within this range, it is preferred to continuously or intermittently supply the consumed amount of IAN or CAN into the autoclave.

As described in the foregoing, in the present invention, the inner layer (I) of the multi-layer hose is made of a fluorocopolymer which comprises polymerized units (a) based on tetrafluoroethylene, polymerized units (b) based on ethylene and polymerized units (c) based on itaconic anhydride and/or citraconic anhydride, wherein the molar ratio of (a)/(b) is from 20/80 to 80/20 and the molar ratio of (c)/((a)+(b)) is from 1/10,000 to 5/100 and which has a volume flow rate of from 1 to 1,000 mm³/sec, and such inner layer (I) is laminated with the outer layer (II) made of a polyamide resin to have a multi-layer structure. This is the most basic embodiment of the present invention as defined in the above Item 1.

Further, as defined in the above Item 2, to the above-described fluorocopolymer, an ethylene/tetrafluoroethylene copolymer (hereinafter referred to as "ETFE2") other than such fluorocopolymer, may be added or incorporated.

Thus, it is preferred to incorporate ETFE2 to such an extent that the adhesion with the polyamide resin will not decrease, to obtain a composition (blend), since it is thereby possible to improve the fuel barrier property of the fluorocopolymer.

ETFE2 is preferably ETFE comprising polymerized units (a) based on TFE, polymerized units (b) based on E and polymerized units (d) based on another monomer. The molar ratio of (a)/(b) is preferably from 50/50 to 70/30, more preferably from 55/45 to 65/35. If the molar ratio of (a)/(b) is too small, the heat resistance, weather resistance, chemical resistance, fuel barrier property, gas barrier property, etc. of ETFE2 will decrease, and if the molar ratio is too large, the mechanical strength, melt processability, etc. will decrease. Thus, when the molar ratio is within this range, the fluorocopolymer will be one excellent in the heat resistance, weather resistance, chemical resistance, gas barrier property, fuel barrier property, mechanical strength, melt processability, etc.

The polymerized units (d) based on another monomer may, for example, be those based on the above-mentioned monomers. As such a monomer, a compound represented by $CH_2=CX(CF_2)_nY$ of the formula (1) (wherein X and Y are as defined above) is preferred. Particularly preferred is one wherein n is from 2 to 4, whereby ETFE2 will be excellent in the fuel barrier property, and accordingly, the multi-layer hose of the present invention will be one excellent in the fuel barrier property. More preferably specific examples of another monomer include $CH_2=CH(CF_2)_2F$, $CH_2=CH(CF_2)_3F$, $CH_2=CH(CF_2)_4F$, $CH_2=CH(CF_2)_2H$, $CH_2=CH(CF_2)_4H$, $CH_2=CF(CF_2)_2H$, $CH_2=CF(CF_2)_3H$ and $CH_2=CF(CF_2)_4H$. The content of polymerized units (d) based on another monomer is preferably from 0.1 to 10 mol %, more preferably from 0.2 to 7 mol %, most preferably from 0.5 to 5 mol %, based on the total polymerized units in ETFE2.

The amount of ETFE2 to be incorporated, is such that the mass ratio of the fluorocopolymer (the polymer comprising polymerized units based on IAN and/or CAN)/ETFE2 is from 1/99 to 80/20, preferably from 3/97 to 70/30, most preferably from 5/95 to 60/40. If ETFE2 is less than this range, the effect for improving the fuel barrier property will be inadequate, and if it is too much, the interlayer adhesion strength with the outer layer made of a polyamide resin, will decrease, such being undesirable. When the amount of ETFE2 to be incorporated, is within this range, the fuel barrier property will be particularly excellent, and the adhesion with the polyamide resin will be also excellent.

The fluorocopolymer to form the inner layer (I) of the multi-layer hose of the present invention, may further contain optional components such as other thermoplastic resins, a filler such as silica, carbon, glass fiber or carbon fiber, a pigment, a plasticizer, a tackifier, a silane coupling agent, a flame retardant and a photostabilizer.

On the other hand, the polyamide resin constituting the outer layer (II) in the multi-layer hose of the present invention, is polyamide 11 (nylon 11) and/or polyamide 12 (nylon 12), which satisfies a condition of (terminal amino group concentration)/(terminal carboxyl group concentration)>1 (hereinafter sometimes referred to as "terminal modified polyamide 11 and/or polyamide 12" or "terminal modified polyamide 12 or the like").

The above terminal modified polyamide 11 and/or polyamide 12 satisfies (terminal amino group concentration)/(terminal carboxyl group concentration)>1, preferably (terminal amino group concentration)/(terminal carboxyl group concentration)>1.5, more preferably (terminal amino group concentration)/(terminal carboxyl group concentration)>2.0. If (terminal amino group concentration)/(terminal carboxyl group concentration)≦1, the adhesion strength with the inner layer (I) made of the fluorocopolymer will be inadequate, such being undesirable.

Further, the terminal amino group concentration is preferably at least 30 meq, more preferably at least 40 meq and at most 80 meq, per 1 kg of the polyamide resin, from the viewpoint of the melt stability of the polyamide resin, and suppression of formation of a gelled substance.

When the terminal modified polyamide 12 or the like satisfies the above-mentioned terminal group concentrations, the adhesion strength with the inner layer (I) made of the fluorocopolymer will be excellent, and excellent fuel resistance will be obtained. Still further, such is preferred also from the viewpoint of the melt stability of the terminal modified polyamide 12 or the like and suppression of formation of a gelled substance.

The terminal modified polyamide 11 to be used in the present invention, can be obtained by polymerizing 11-aminoundecanoic acid or undecenelactam.

Whereas, the terminal modified polyamide 12 to be used in the present invention, can be obtained by polymerizing 12-aminododecanoic acid or laurolactam.

The terminal modified polyamide 11 and/or polyamide 12 may be a copolymer made of the above monomers as the main components (at least 60 mass %). As the copolymerizable component, a lactam of 3 or more-membered ring, an amino carboxylic acid or a nylon salt made of a diamine and a dicarboxylic acid, may be mentioned.

The lactam of 3 or more-membered ring, may, for example, be ε-caprolactam, ω-enanthlactam, α-pyrrolidone or α-piperidone. The amino carboxylic acid may, for example, be 6-aminocaproic acid, 7-aminoheptanoic acid or 9-aminononanoic acid.

Further, the diamine constituting the nylon salt may, for example, be an aliphatic diamine such as ethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecamethylenediamine, tetradecamethylenediamine, pentadecamethylenediamine, hexadecamethylenediamine, heptadecamethylenediamine, octadecamethylenediamine, nonadecamethylenediamine, eicosamethylenediamine, 2/3-methyl-1,5-pentanediamine, 2-methyl-1,8-octandiamine, 2,2,4/2,4,4-trimethylhexamethylenediamine or 5-methyl-1,9-nonanediamine; an alicyclic diamine such as 1,3/1,4-cyclohexanediamine, 1,3/1,4-cyclohexanedimethylamine, bis(4-aminocyclohexyl)methane, bis(4-aminocyclohexyl)propane, bis(3-methyl-4-aminocyclohexyl)methane, bis(3-methyl-4-aminocyclohexyl)propane, 5-amino-2,2,4-trimethyl-1-cyclopentanemethylamine, 5-amino-1,3,3-trimethylcyclohexanemethylamine(isophoronediamine), bis(aminopropyl)piperazine, bis(aminoethyl)piperazine, norbornane dimethylamine or tricyclodecandimethylamine; or an aromatic diamine such as paraxylylene diamine or metaxylylene diamine.

On the other hand, the dicarboxylic acid constituting the nylon salt may, for example, be an aliphatic dicarboxylic acid such as adipic acid, pimelic acid, suberic acid, azelaic acid, sebacic acid, undecanedione acid, dodecanedione acid, tridecanedione acid, tetradecanedione acid, pentadecanedione acid, hexadecanedione acid, octadecanedione acid or eicosandione acid; an alicyclic dicarboxylic acid such as 1,3/1,4-cyclohexanedicarboxylic acid, dicyclohexanemethane-4,4-dicarboxylic acid or norbornane dicarboxylic acid; or an aromatic dicarboxylic acid such as isophthalic acid, terephthalic acid or 1,4/2,6/2,7-naphthalene dicarboxylic acid.

The terminal modified polyamide 12 or the like to be used in the present invention can be prepared from the above-mentioned monomer by polymerization by repeating normal pressure, reduced pressure or elevated pressure operation by means of known polymerization methods such as melt polymerization, solution polymerization and solid phase polymerization. These polymerization methods may be used alone or in a suitable combination. The apparatus which can be used for the polymerization may, for example, be a batch system reactor, a single vessel system or multi vessel system continuous polymerization apparatus, a tubular continuous polymerization apparatus or a kneading reactive extrusion apparatus, as a preferred example.

For example, the terminal modified polyamide 12 or the like can be prepared by polymerizing or copolymerizing the above-mentioned polyamide material in the presence of an amine by a known method such as melt polymerization, solution polymerization or solid phase polymerization. Otherwise, it can be prepared by melt-kneading in the presence of an amine after the polymerization. Namely, an amine can be added basically at an optional stage during the polymerization or at an optional stage during the melt kneading after the polymerization. However, it is preferred to add the amine at a stage during the polymerization, when the fuel resistance of the interlayer adhesion strength in the multi-layer hose is taken into consideration.

The above-mentioned amine may, for example, be a monoamine, a diamine or a triamine. Further, in addition to such an amine, a carboxylic acid such as a monocarboxylic acid, a dicarboxylic acid or a tricarboxylic acid, may also be added, as the case requires, so long as the ratio of the terminal group concentrations will not depart from the above-mentioned range. Such an amine and a carboxylic acid may be added simultaneously or separately. Further, the following amines and carboxylic acids may, respectively, be used alone or in combination as a mixture of two or more of them.

Specific examples of the monoamine to be added, include an aliphatic monoamine such as methylamine, ethylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, octadecyleneamine, eicocylamine or docoycylamine; an alicyclic monoamine such as cyclohexylamine or methylcyclohexylamine; an aromatic monoamine such as benzylamine or β-phenylmethylamine; a symmetrical secondary amine such as N,N-dimethylamine, N,N-diethylamine, N,N-dipropylamine, N,N-dibutylamine, N,N-dihexylamine or N,N-dibutylamine; and a composite secondary amine such as N-methyl-N-ethylamine, N-methyl-N-butylamine, N-methyl-N-dodecylamine, N-methyl-N-octadecylamine, N-methyl-N-hexadecylamine, N-methyl-N-octadecylamine, N-propyl-N-hexadecylamine or N-propyl-N-benzylamine.

Specific examples of the diamine to be added include an aliphatic diamine such as ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecamethylenediamine, hexadecamethylenediamine, octadecamethylenediamine or 2,2,4-/2,4,4-trimethylhexamethylenediamine; an alicyclic diamine such as 1,3/1,4-cyclohexanediamine, 1,3/1,4-cyclohexanedimethylamine, 5-amino-2,2,4-trimethyl-1-cyclopentanemethylamine, 5-amino-1,3,3-trimethylcyclohexanemethylamine(isophoronediamine), bis(4-aminocyclohexyl)methane, bis(4-aminocyclohexyl)propane, bis(3-methyl-4-aminocyclohexyl)methane, bis(3-methyl-4-aminocyclohexyl)propane, norbornanedimethylamine or tricyclodecanedimethylamine; and an aromatic diamine such as metaxylylene diamine or paraxylylene diamine.

Specific examples of the triamine to be added include diethylene triamine, bis(pentamethylene)triamine, bis(hexamethylene)triamine, bis(heptamethylene)triamine, bis(octamethylene)triamine, bis(nonamethylene)triamine, bis(decamethylene)triamine, bis(undecamethylene)triamine, bis(dodecamethylene)triamine and tris(2-aminoethyl)amine.

On the other hand, the carboxylic acid to be added include an aliphatic monocarboxylic acid such as acetic acid, propionic acid, butyric acid, valeric acid, caproic acid, enanthic acid, caprylic acid, capric acid, pelargonic acid, undecanoic acid, lauric acid, tridecanoic acid, myristic acid, myristoleic acid, palmitic acid, stearic acid, oleic acid, linoleic acid, arachic acid, behenic acid or erucic acid; an alicyclic monocarboxylic acid such as cyclohexanecarboxylic acid or methylcyclohexanecarboxylic acid; an aromatic monocarboxylic acid such as benzoic acid, toluic acid, ethyl benzoic acid or phenyl acetic acid; an aliphatic dicarboxylic acid such as malonic acid, succinic acid, glutaric acid, adipic acid, pimelic acid, suberic acid, azelaic acid, sebacic acid, undecanedione acid, dodecanedione acid, hexadecanedione acid, hexadecenedione acid, octadecadione acid, octadecenedione acid, eicosandione acid, eicosendione acid, docosandione acid, diglycolic acid or 2,2,4-trimethyladipic acid; an alicyclic dicarboxylic acid such as 1,4-cyclohexanedicarboxylic acid; an aromatic dicarboxylic acid such as terephthalic acid, isophthalic acid, phthalic acid, metaxylylene dicarboxylic acid or paraxylylene dicarboxylic acid; and a tricarboxylic acid such as 1,2,4-butanetricarboxylic acid, 1,3,5-pentanetricarboxylic acid, 1,2,6-hexatricarboxylic acid, 1,3,6-hexatricarboxylic acid, 1,3,5-cyclohexanetricarboxylic acid or trimesic acid.

The terminal modified polyamide 11 and/or polyamide 12 to be used in the present invention, is preferably a terminal modified polyamide 12 prepared by adding a diamine during the polymerization, more preferably one wherein the above diamine is at least one member selected from the group consisting of aliphatic diamines and alicyclic diamines, from the viewpoint of the fuel resistance of the interlayer adhesion strength with the inner layer (I) made of the fluorocopolymer, the melt stability and suppression of formation of a gelled substance.

Further, the terminal modified polyamide 12 or the like may be a mixture of two or more polyamides 11 or a mixture of two or more polyamides 12, which are different in the terminal group concentrations. In such a case, the terminal amino group concentration and the terminal carboxyl group concentration of the mixture of a plurality of polyamides 11 or polyamides 12, are determined by the terminal amino group concentrations, the terminal carboxyl group concentrations and the blend ratio of the plurality of constituting polyamides 11 or polyamides 12. At that time, it is necessary that at least one constituting component is polyamide 11 and/or polyamide 12 which satisfies the condition of (terminal amino group concentration)/(terminal carboxyl group concentration)<1.

The terminal modified polyamide 12 or the like is one having a relative viscosity of from 1.5 to 3.5, preferably from 1.8 to 3.0, as measured in accordance with JIS K6920. If the relative viscosity is smaller than the above range, the mechanical property of the obtainable multi-layer hose is likely to be inadequate, and if it is too large beyond the above range, the extrusion pressure or torque tends to be too high during the processing, whereby the production of a multi-layer hose is likely to be difficult.

Further, the terminal modified polyamide 12 or the like to be used in the present invention may be a single polymer, a mixture with the above-mentioned copolymer or a mixture (blend) with another polyamide resin or another thermoplastic resin. The content of the terminal modified polyamide 12 or the like in the mixture is preferably at least 60 mass %. Further, of course, it may be a mixture of the terminal modified polyamide 11 and the terminal modified polyamide 12.

Said another polyamide resin to be blended may be a homopolymer such as polycaproamide (nylon 6), polyethylene adipamide (nylon 26), polytetramethyleneadipamide (nylon 46), polyhexamethyleneadipamide (nylon 66), polyhexamethyleneazepamide (nylon 69), polyhexamethylenesebacamide (nylon 610), polyhexamethyleneundecamide (nylon 611), polyhexamethylenedodecamide (nylon 612), polyhexamethyleneterephthalamide (nylon 6T), polyhexamethyleneisophthalamide (nylon 6I), polynonamethylenedodecamide (nylon 912), polydecamethylenedodecamide (nylon 1012), polydecamethylenedodecamide (nylon 1212), polymethaxyleneadipamide (nylon MXD6), polytrimethylhexamethyleneterephthalamide (TMHT), polybis(4-aminocyclohexyl)methane dodecamine (nylon PACM12) or polybis(3-methyl-4-aminocyclohexyl) methane dodecamide (nylondimethyl PACM12), or a copolymer prepared by using the starting monomer for such a homopolymer.

Further, said another thermoplastic resin to be blended may, for example, be a polyolefin resin such as high density polyethylene (HDPE), low density polyethylene (LDPE), ultrahigh molecular polyethylene (UHMWPE), isotactic polypropylene, ethylene/propylene copolymer (EPR), ethylene/vinyl acetate copolymer (EVA), ethylene/vinyl acetate copolymer saponified product (EVOH), ethylene/acrylic acid copolymer (EAA), ethylene/methacrylic acid copolymer (EMAA), ethylene/methyl acrylate copolymer (EMA), ethylene/methyl methacrylate copolymer (EMMA) or ethylene/ethyl acrylate copolymer (EEA); a polyester resin such as polybutylene terephthalate (PBT), polyethylene terephthalate (PET), polyethylene isophthalate (PEI), polyhexylene terephthalate (PCT), PET/PEI copolymer, polyarylate (PAR), polybutylene naphthalate (PBN), polyethylene naphthalate (PEN) or liquid crystal polyester (LCP); a polyether resin such as polyacetal (POM) or polyphenylene oxide (PPO); a polysulfone resin such as polysulfone (PSF) or polyethersulfone (PES); a polythioether resin such as polyphenylene sulfide (PPS) or polythioethersulfone (PTES); a polyketone resin such as polyether ether ketone (PEEK) or polyallyl ether ketone (PEAK); a polynitrile resin such as polyacrylonitrile (PAN), polymethacrylnitrile, acrylonitrile/styrene copolymer (AS), methacrylonitrile/styrene copolymer, acrylonitrile/butadiene/styrene copolymer (ABS) or methacrylonitrile/styrene/butadiene copolymer (MPS); a polymethacrylate resin such as polymethyl methacrylate (PMMA) or polyethyl methacrylate (PEMA); a polyvinyl acetate resin such as polyvinyl acetate (PVAc); a polyvinyl chloride resin such as polyvinylidene chloride (PVDC), polyvinyl chloride (PVC), vinyl chloride/vinylidene chloride copolymer or vinylidene chloride/methyl acrylate copolymer; a cellulose resin such as cellulose acetate or cellulose lactate; a polycarbonate resin such as polycarbonate (PC); a polyimide resin such as thermoplastic polyimide (PI), polyamide imide (PAI) or polyether imide (PEI); or a thermoplastic polyurethane resin.

Further, it is preferred to add a plasticizer to the terminal modified polyamide 12 or the like to be used in the present invention. The plasticizer may, for example, be a benzene sulfonic acid alkyl amide, a toluene sulfonic acid alkyl amide or a hydroxybenzoic acid alkyl ester.

The benzene sulfonic acid alkyl amide may, for example, be benzene sulfonic acid propyl amide, benzene sulfonic acid butyl amide or benzene sulfonic acid 2-benzylhexyl amide.

Further, the toluene sulfonic acid alkyl amide may, for example, be N-ethyl-o- or N-ethyl-p-toluene sulfonic acid butyl amide or N-ethyl-o- or N-ethyl-p-toluene sulfonic acid 2-ethylhexyl amide.

The hydroxybenzoic acid alkyl ester may, for example, be ethylhexyl o- or p-hydroxybenzoate, hexyldecyl o- or p-hydroxybenzoate, ethyldecyl o- or p-hydroxybenzoate, octyloctyl o- or p-hydroxybenzoate, decyldodecyl o- or p-hydroxybenzoate, methyl o- or p-hydroxybenzoate, butyl o- or p-hydroxybenzoate, hexyl o- or p-hydroxybenzoate, n-octyl o- or p-hydroxybenzoate, decyl o- or p-hydroxybenzoate or dodecyl o- or p-hydroxybenzoate.

Among the above, a benzene sulfonic acid alkyl amide such as benzene sulfonic acid butyl amide or benzene sulfonic acid 2-ethylhexyl amide; a toluene sulfonic acid alkyl amide such as N-ethyl-p-toluene sulfonic acid butyl amide or N-ethyl-p-toluene sulfonic acid 2-ethylhexyl amide; or a hydroxybenzoic acid alkyl ester such as ethylhexyl p-hydroxybenzoate, hexyldecyl p-hydroxybenzoate or ethyldecyl p-hydroxybenzoate, is preferably employed. Particularly preferably, benzene sulfonic acid butyl amide, methylhexyl p-hydroxybenzoate or hexyldecyl p-hydroxybenzoate may, for example, be used.

The amount of the plasticizer is from 1 to 30 parts by mass, preferably from 1 to 15 parts by mass, per 100 parts by mass of the terminal modified polyamide 12 or the like. If the amount of the plasticizer is less than 1 part by mass, no substantial plasticizing effect can be obtained, and if the amount of the plasticizer exceeds 30 parts by mass, the low temperature impact resistance of the multi-layer hose tends to be low, such being undesirable.

Further, it is preferred to add an impact-reducing material to the terminal modified polyamide 12 or the like to be used in the present invention. The impact-reducing material is a rubbery polymer intended to improve the impact resistance and is preferably one having a tensile modulus of elasticity of at least 500 MPa as measured in accordance with ASTM D882. If the tensile modulus of elasticity is larger than this value, such will be inadequate as an impact-reducing material.

The impact-reducing material may, for example, be an (ethylene and/or propylene)/α-olefin copolymer; an (ethylene and/or propylene)/(α,β-unsaturated carboxylic acid and/or an unsaturated carboxylic acid ester) copolymer; an ionomer polymer; an aromatic vinyl compound/a conjugated diene compound block copolymer or a polyamide elastomer. These materials may be used alone or as mixed.

The above-mentioned (ethylene and/or propylene)/α-olefin copolymer is a polymer obtained by copolymerizing ethylene and/or propylene with an α-olefin having at least 3 carbon atom. The α-olefin having at least 3 carbon atom may be propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 4-methyl-1-butene, 3-methyl-1-pentene, 3-ethyl-1-pentene, 1-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene or 12-ethyl-1-tetradecene, or a combination thereof.

Further, a polyene of a non-conjugated diene such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, dicyclobutadiene, methylene norbornene, 5-vinyl norbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene or 2-propenyl-2,2-norbornadiene, may be copolymerized.

The above-mentioned (ethylene and/or propylene)/(an α,β-unsaturated carboxylic acid and/or an unsaturated carboxylic acid ester) copolymer is a polymer obtained by copolymerizing ethylene and/or propylene with an α,β-unsaturated carboxylic acid and/or an unsaturated carboxylic acid ester monomer. The α,β-unsaturated carboxylic acid monomer may be acrylic acid or methacrylic acid, and the α,β-unsaturated carboxylic acid ester monomer may be a methyl ester, an ethyl ester, a propyl ester, a butyl ester, a pentyl ester, a hexyl ester, a heptyl ester, an octyl ester, a nonyl ester or a decyl ester of such an unsaturated carboxylic acid, or a mixture thereof.

The above-mentioned ionomer polymer is one having at least some of carboxyl groups of a copolymer of an olefin with an α,β-unsaturated carboxylic acid ionized by neutralization with metal ions. As the olefin, ethylene is preferably employed, and as the α,β-unsaturated carboxylic acid, acrylic acid or methacrylic acid is preferably employed. However, they are not limited to those exemplified here, and an unsaturated carboxylic acid ester monomer may be copolymerized thereto. Further, the metal ions may, for example, be Al, Sn, Sb, Ti, Mn, Fe, Ni, Cu, Zn or Cd, in addition to an alkali metal or an alkaline earth metal, such as Li, Na, K, Mg, Ca, Sr or Ba.

Further, the aromatic vinyl compound/a conjugated diene compound block-copolymer is a block copolymer comprising aromatic vinyl compound polymer blocks and conjugated diene compound polymer blocks, and a block copolymer having at least one aromatic vinyl compound polymer block and at least one conjugated diene compound polymer block, is employed. Further, in such a block copolymer, the unsaturated bond in the conjugated diene compound polymer block may be hydrogenated.

The aromatic vinyl compound polymer block is a polymer block composed mainly of structural units derived from an aromatic vinyl compound. In such a case, the aromatic vinyl compound may, for example, be styrene, α-methylstyrene, o-methylstyrene, m-methylstyrene, p-methylstyrene, 1,3-dimethylstyrene, 2,4-dimethylstyrene, vinyl naphthalene, vinyl anthracene, 4-propylstyrene, 4-cyclohexylstyrene, 4-dodecylstyrene, 2-ethyl-4-benzylstyrene or 4-(phenylbutyl)styrene. The aromatic vinyl compound polymer block may have structural units made of one of more types of the above-mentioned monomers. Further, the aromatic vinyl compound polymer block may have structural units made of a small amount of other unsaturated monomers, as the case requires.

The conjugated diene compound polymer block is a polymer block formed of one or more types of conjugated diene compounds such as 1,3-butadiene, chloroprene, isoprene, 2,3-dimethyl-1,3-butadiene, 1,3-pentadiene, 4-methyl-1,3-pentadiene and 1,6-hexadiene. In the hydrogenated aromatic vinyl compound/conjugated diene block copolymer, some or all of unsaturated bond portions in the conjugated diene compound polymer block are hydrogenated to saturated bonds. Here, the distribution in the polymer block composed mainly of a conjugated diene may be random, tapered, partially blocked or an optional combination thereof.

The molecular structure of the aromatic vinyl compound/conjugated diene compound block copolymer or its hydrogenated product, may be linear, branched, radial or an optional combination thereof. Among them, in the present invention, as the aromatic vinyl compound/conjugated diene block copolymer and/or its hydrogenated product, at least one of a diblock copolymer wherein one aromatic vinyl compound polymer block and one conjugated diene compound polymer block are linearly bonded; a triblock copolymer wherein three polymer blocks are linearly bonded in the order of an aromatic vinyl compound polymer block/conjugated diene compound polymer block/aromatic vinyl compound polymer block; and their hydrogenated products, is preferably employed. Specifically, a non-hydrogenated or hydrogenated styrene/butadiene copolymer, a non-hydrogenated or hydrogenated styrene/isoprene copolymer, a non-hydrogenated or hydrogenated styrene/isoprene/styrene copolymer, a non-hydrogenated or hydrogenated styrene/butadiene/styrene copolymer or a non-hydrogenated or hydrogenated styrene/(isoprene/butadiene)/styrene copolymer may, for example, be mentioned.

The above-mentioned polyamide elastomer is a block copolymer comprising mainly polyamide-forming units as hard segments and polyether units or polyether ester units formed by polycondensation of a polyether with a dicarboxylic acid, as soft segments. It may, for example, be a polyether ester amide elastomer or a polyether amide elastomer.

The polyamide-forming unit as such a hard segment may, for example, be a lactam of at least 3-membered ring, an aminocarboxylic acid or a nylon salt made of a dicarboxylic acid and a diamine.

The lactam of at least 3-membered ring may, for example, be ε-caprolactam or laurolactam. The aminocarboxylic acid may, for example, be 6-aminocaproic acid, 11-aminoundecanoic acid or 12-aminododecanoic acid.

As the dicarboxylic acid to constitute the nylon salt, a $C_{2-36}$ dicarboxylic acid is usually employed. Specifically, it may, for example, be an aliphatic dicarboxylic acid such as adipic acid, pimelic acid, suberic acid, azelaic acid, sebacic acid, undecanedione acid, dodecanedione acid or 2,2,4-trimethyladipic acid; an alicyclic dicarboxylic acid such as 1,4-cyclohexanedicarboxylic acid; or an aromatic dicarboxylic acid such as terephthalic acid, isophthalic acid, phthalic acid or xylene dicarboxylic acid. Further, as a $C_{36}$ dicarboxylic acid, a dimeric fatty acid may be mentioned. The dimeric fatty acid is a polymerized fatty acid obtainable by polymerizing e.g. a $C_{8-24}$ saturated, ethylenically unsaturated, acetylenically unsaturated, natural or synthetic monobasic fatty acid.

As the diamine to constitute the nylon salt, a $C_{2-36}$ diamine is usually employed. Specifically, it may, for example, be an aliphatic diamine such as ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine or 2,2,4/2,4,4-trimethylhexamethylenediamine; an alicyclic diamine such as 1,3/1,4-cyclohexanedimethylamine or bis (4,4'-aminocyclohexyl)methane; or an aromatic diamine such as xylylene diamine. Further, as a $C_{36}$ diamine, a dimeric amine having carboxyl groups of the dimeric fatty acid changed to amino acids, may be mentioned.

Further, the polyether unit as a soft segment may, for example, be polyethylene glycol, polypropylene glycol, polytetramethylene glycol, polyhexamethylene glycol tetrahydrofuran or a copolymer prepared by using a plurality of such polyether-forming monomers.

The polyether ester amide elastomer is a polyamide elastomer comprising the above polyether and the above polyamide-forming unit having terminal carboxyl groups prepared by introducing the above-mentioned dicarboxylic acid.

Further, the polyether amide elastomer is a polyamide elastomer comprising a polyether unit obtained by substituting an amino group and/or a carboxyl group for the terminal hydroxyl group of the above-mentioned polyether, and a polyamide-forming unit having a carboxyl group and/or an amino group at the terminal.

Further, the above-mentioned (ethylene and/or propylene)/α-olefin copolymer, the (ethylene and/or propylene)/(α,β-unsaturated carboxylic acid and/or unsaturated carboxylic ester) copolymer, the ionomer polymer, the block copolymer of an aromatic vinyl compound and a conjugated diene compound, to be used as an impact-reducing material, is employed preferably in the form of a polymer modified by a carboxylic acid and/or its derivative. By the modification with such a component, the obtainable multi-layer hose will be one having a low temperature impact property and a mechanical property well balanced.

As the carboxylic acid and/or its derivative to be used for the modification, a carboxylic acid group, a carboxylic anhydride group, a carboxylic acid ester group, a carboxylic acid metal salt group, a carboxylic acid imide group, a carboxylic acid amide group or an epoxy group may, for example, be mentioned. Examples for a compound containing such a functional group include acrylic acid, methacrylic acid, maleic acid, fumaric acid, itaconic acid, crotonic acid, methyl maleic acid, methyl fumaric acid, metaconic acid, citraconic acid, glutaconic acid, cis-4-cyclohexene-1,2-dicarboxylic acid, endcis-bicyclo[2,2,1]hepto-5-ene-2,3-dicarboxylic acid and metal salts of these carboxylic acids, monomethyl maleate, monomethyl itaconate, methyl acrylate, ethyl acrylate, butyl acrylate, 2-ethylhexyl acrylate, hydroxyethyl acrylate, methyl methacrylate, 2-ethylhexyl-methacrylate, hydroxyethyl methacrylate, aminoethyl methacrylate, dimethyl maleate, dimethyl itaconate, maleic anhydride, itaconic anhydride, citraconic anhydride, endobicyclo-[2,2,1]-5-heptene-2,3-dicarboxylic acid anhydride, maleimide, N-ethyl maleimide, N-butyl maleimide, N-phenyl maleimide, acrylamide, methacrylamide, glycidyl acrylate, glycidyl methacrylate, glycidyl ethacrylate, glycidyl itaconate and glycidyl citraconate.

The amount of the impact-reducing material is from 1 to 35 parts by mass, preferably from 5 to 25 parts by mass, more preferably from 7 to 20 parts by mass, per 100 parts by mass of the terminal modified polyamide 12 or the like. If the amount of the impact-reducing material exceeds 35 parts by mass, the inherent mechanical property as a multi-layer hose tends to be impaired, such being undesirable.

Further, to the terminal modified polyamide 12 or the like to be used in the present invention, an antioxidant of e.g. a phenol type, a thioether type, a phosphite type or an amine type; an ultraviolet absorber of e.g. a salicylate type, a benzophenone type, a benzotriazole type, a cyanoacrylate type or a metal complex type; a weather resistance-improving agent of HALS type; an antistatic agent such as an alkylamine, an alkylamide, an alkyl ether, an alkyl phenyl ether, a glycerol fatty acid ester, a sorbitan fatty acid ester, an alkyl sulfonate, an alkylbenzene sulfonate, an alkyl sulfate, an alkyl phosphate, a quaternary ammonium salt or an alkyl betain; an inorganic flame retardant such as red phosphorus, tin oxide, zirconium hydroxide, barium metaborate, aluminum hydroxide or magnesium hydroxide; an organic flame retardant of a halogen type, a phosphate type, a melamine or cyanuric acid type; a flame retarding ajuvant such as antimony trioxide; others such as a lubricant, a nucleic agent, a crystallization accelerating agent, an oil agent, a pigment, a dye stuff and an inorganic filler, may be incorporated as the case requires.

As described above, the multi-layer hose of the present invention has a multi-layer structure wherein the outer layer (II) of the multi-layer hose is formed by polyamide 11 and/or polyamide 12 which satisfies a condition of (terminal amino group concentration)/(terminal carboxyl group concentration)>1, and the inner layer (I) made of a fluorocopolymer containing itaconic anhydride and/or citraconic anhydride, is laminated therewith.

In the multi-layer hose of the present invention, the adhesion strength between the inner layer (I) and the outer layer (II) is at least 20 N/cm, preferably at least 30 N/cm, more preferably at least 40 N/cm, most preferably at least 50 N/cm.

Further, the dependency on the winding rate during the production of the hose is preferably as small as possible. It is preferably at least 20 N/cm even at a high winding rate of 50 m/min.

In the present invention, even at a high winding rate of e.g. 50 m/min during the production of the multi-layer hose, it is possible to obtain such a high interlayer adhesion strength. In other words, in the present invention, the dependency of the interlayer adhesion strength on the winding rate during the production of the multi-layer hose, is extremely small.

In a case where the multi-layer hose of the present invention is to be used for transportation of a liquid fuel, the inner layer, particularly the innermost layer material, is sometimes required to have electrical conductivity. By such electrical conductivity, it becomes possible to remove static electricity generated during the transportation of a fluid such as a liquid fuel. In such a case, in order for the electrical conductivity to be effectively provided, the surface resistance as an index of the electrical conductivity, particularly the surface resistance of the fluorocopolymer constituting the inner layer (I), is preferably at most $10^6$ Ω/square, as measured in accordance with SAE J2260.

It is preferred that the electrical conductivity is developed by adding an electrical conductivity-imparting filler to the innermost layer of the multi-layer hose.

The electrical conductivity-imparting filler may, for example, be a powder of metal such as copper, nickel or silver; fiber of metal such as iron or stainless steel; a carbon type conductive filler such as carbon black, carbon fiber or carbon nanotube, or a metal inorganic compound having the surface of e.g. zinc oxide, glass beads or titanium oxide coated by metal sputtering or electroless plating. Among them, carbon black is most preferred, since hydroxyl groups or carboxyl groups are present on the particle surface, and they also serve as adhesive groups to improve the adhesion of the inner layer.

The content of the electrical conductivity-imparting filler is optionally determined depending upon the type of the filler, the composition of the fluorinated resin such as ETFE constituting the innermost layer, and the designed electrical conductivity performance of the multi-layer hose and the processing conditions. However, it is usually preferably from 1 to 30 parts by mass, particularly preferably from 5 to 20 parts by mass, per 100 parts by mass of the resin constituting the inner layer such as ETFE. However, the above-mentioned conductive filler is likely to adversely affect the strength or fluidity of the resin to which it is incorporated. Accordingly, its content is preferably as small as possible within a range where the desired conductivity level is obtainable.

The multi-layer hose of the present invention is basically a multi-layer structure having laminated the inner layer (I) made of the fluorocopolymer and the outer layer (II) made of the polyamide resin (the terminal modified polyamide 11 and/or polyamide 12), i.e. a multi-layer structure of [(II)/(I)] (hereinafter sometimes referred to as "the basic layer structure").

The total number of layers in the multi-layer hose of the present invention is not particularly limited so long as the above basic layer structure is contained. It may be at least two layers, but in view of the construction of the apparatus for producing the multi-layer structure, it is usually at most 7 layers, preferably from 2 to 6 layers, more preferably from 2 to 5 layers.

For example, the following layer structures may be mentioned.

(1) (II')/(II)/(I), wherein (II') is usually a layer made of a polyamide resin other than one defined by the present invention, but does not exclude a polyamide resin defined by the present invention (the same applies hereinafter).

(2) (II')/(I)/(I'), wherein (I') is usually a layer made of a fluorinated resin other than one defined by the present invention, but does not exclude a fluorinated resin defined by the present invention. Further, this layer may be a layer made of an electroconductive resin composition or a layer having no electrical conductivity (the same applies hereinafter).

(3) (II')/(II)/(I)/(I')

(4) (II)/(I)/(I')/(I''), wherein (I'') is usually a layer made of an electroconductive fluorinated resin composition other than one defined by the present invention, which is different from (I'), but does not exclude an electroconductive fluorinated resin composition defined by the present invention (the same applies hereinafter).

(5) (II')/(II)/(I)/(I')/(I'')

Here, it should be mentioned that in the basic layer structure [(II)/(I)] or in each layer structure as described above, the layer (I) made of a fluorinated resin defined by the present invention may be a layer made of an electroconductive resin composition.

The polyamide resin other than one defined by the present invention may, for example, be polycaproamide (nylon 6), polyethylene adipamide (nylon 26), polytetramethyleneadipamide (nylon 46), polyhexamethyleneadipamide (nylon 66), polyhexamethyleneazepamide (nylon 69), polyhexamethylenesebacamide (nylon 610), polyhexamethyleneundecamide (nylon 611), polyhexamethylenedodecamide (nylon 612), polyhexamethyleneterephthalamide (nylon 6T), polyhexamethyleneisophthalamide (nylon 6I), polynonamethylenedodecamide (nylon 912), polydecamethylenedodecamide (nylon 1012), polydecamethyleneterephthalamide (nylon 10T), polydecamethylenedodecamide (nylon 1212), polymethaxyleneadipamide (nylon MXD6), polytrimethylhexamethyleneterephthalamide (TMHT), polybis(4-aminocyclohexyl)methane dodecamine (nylon PACM12), polybis(3-methyl-4-aminocyclohexyl)methane dodecamide (nylondimethyl PACM12), or a copolymer prepared by using a plurality of polyamide material monomers constituting such resins, or a mixture thereof.

Further, the fluorinated resin other than one defined by the present invention, which constitutes (I') or the like, may, for example, be polyvinylidene fluoride (PVDF), polychlorotrifluoroethylene (PCTFE), ethylene/tetrafluoroethylene copolymer (ETFE), ethylene/chlorotrifluoroethylene copolymer (ECTFE), tetrafluoroethylene/hexafluoropropylene copolymer (TFE/HFP, FEP), tetrafluoroethylene/hexafluoropropylene/vinylidene fluoride copolymer (TFE/HFP/VdF, THV), tetrafluoroethylene/perfluoro(alkyl vinyl ether) copolymer (PFA), or a mixture thereof.

Further, the multi-layer hose of the present invention may have, in addition to the inner layer (I) and the outer layer (II), one or more layers made of other thermoplastic resins within a range not to deteriorate the fuel resistance of the interlayer adhesion strength.

Such other thermoplastic resins may, for example, be a polyolefin resin, such as a high density polyethylene (HDPE), a low density polyethylene (LDPE), an ultrahigh molecular weight polyethylene (UHMWPE), an isotactic polypropylene, an ethylene/propylene copolymer (EPR), an ethylene/vinyl acetate copolymer (EVA), an ethylene/vinyl acetate copolymer saponified product (EVOH), an ethylene/acrylic acid copolymer (EAA), an ethylene/methacrylic acid copolymer (EMAA), an ethylene/methyl acrylate copolymer (EMA), an ethylene/methyl methacrylate copolymer (EMMA) or an ethylene/ethyl acrylate copolymer (EEA); a modified polyolefin in which the above polyolefin resin further contains a carboxyl group or its salt, an acid anhydride group, an amino group, an isocyanate group, a glycidyl group, etc.; a polyester resin such as polybutylene terephthalate (PBT), polyethylene terephthalate (PET), polyethylene isophthalate (PEI), a PET/PEI copolymer, polyarylate (PAR), polybutylene naphthol (PBN), polyethylene naphthalate (PEN) or liquid crystal polyester (LCP); a polyether resin such as polyacetal (POM) or polyphenylene oxide (PPO); a polysulfone resin such as polysulfone (PSF) or polyether sulfone (PES); a polythioether resin such as polyphenylene sulfide (PPS) or polythioether sulfone (PTES); a polyketone resin such as polyether ether ketone (PEEK) or polyallyl ether ketone (PEAK); a polynitrile resin such as polyacrylonitrile (PAN), polymethacrylonitrile, acrylonitrile/styrene copolymer (AS), methacrylonitrile/styrene copolymer, acrylonitrile/butadiene/styrene copolymer (ABS) or methacrylonitrile/styrene/butadiene copolymer (MBS); a polymethacrylate resin such as polymethyl methacrylate (PMMA) or polyethyl methacrylate (PEMA); a polyvinyl acetate resin such as polyvinyl acetate (PVAc); a polyvinyl chloride resin such as polyvinylidene chloride (PVDC), polyvinyl chloride (PVC), vinyl chloride/vinylidene chloride copolymer or vinylidene chloride/methyl acrylate copolymer; a cellulose resin such as cellulose acetate or cellulose butyrate; a polycarbonate resin such as polycarbonate (PC); a polyimide resin such as thermoplastic polyimide (PI), polyamide imide (PAI) or polyether imide (PEI); and a thermoplastic polyurethane resin.

Further, an optional base material other than the thermoplastic resin, such as paper, a metal material, a non-stretched, monoaxially stretched or biaxially stretched plastic film or sheet, a woven fabric, a non-woven fabric, a metal cotton material or a wooden material may also be laminated. Here, the metal material may, for example, be a metal or metal compound of e.g. aluminum, iron, copper, nickel, gold, silver, titanium, molybdenum, magnesium, manganese, lead, tin, chromium, beryllium, tungsten or cobalt, an alloy steel such as stainless steel made of two or more types of these metals, or an alloy such as an aluminum alloy, a copper alloy such as brass or bronze, or a nickel alloy.

The outer diameter of the multi-layer hose of the present invention is designed in consideration of the flow rate of a fuel (such as a gasoline fuel), and its wall thickness is designed to be a thickness whereby the permeability of the fuel is sufficiently small and the burst pressure of a usual hose can be maintained and whereby flexibility can be maintained so as to facilitate the attaching operation of the hose and to provide good vibration resistance during its use. They are not particularly limited, but it is usually preferred that the outer diameter is from 4 to 30 mm, the inner diameter is from 3 to 25 mm, and the wall thickness is from 0.05 to 5 mm.

In the multi-layer hose of the present invention, the thickness of each layer is not particularly limited, and may be optionally changed depending upon the type of the polymer or resin constituting each layer, the number of total layers, particular purpose, etc. The thickness of each layer is determined taking into consideration the properties such as the fuel barrier property, low temperature impact resistance, flexibility, etc. of the multi-layer hose.

Specifically, the thickness of each of the inner layer (I) and the outer layer (II) is preferably from 3 to 90%, based on the total thickness of the multi-layer hose. Further, particularly, the thickness of the inner layer (I) is more preferably from 5 to 80%, particularly preferably from 10 to 50%, based on the total thickness of the multi-layer hose, in consideration of the fuel barrier property.

As an example, a multi-layer hose having an outer diameter of 8 mm, an inner diameter of 6 mm and a thickness of 1 mm (inner layer: 0.25 mm, outer layer: 0.75 mm) may be mentioned.

As a processing method for a multi-layer hose of the present invention, there may be mentioned a method wherein cylindrical inner layer and outer layer are separately formed by an extruder, and the outer layer is covered on the inner layer by a heat shrinking hose, or a method wherein an inner layer hose is firstly formed by inner layer extruder, and then, on the outer circumference thereof, an outer layer is formed by an outer layer extruder. However, it is most preferred to employ a coextrusion process wherein the terminal modified polyamide 12 or the like of the outer layer and the fluorocopolymer of the inner layer are coextruded in a molten state and the two are subjected to heat fusion (melt bonding) to form a hose having a double layer structure in one step. Further, also in a case of a multi-layer structure of three or more layers, such a hose can be formed by coextrusion in a similar manner.

Usually, coextrusion is a method to obtain a multi-layer of two or more layer in a film or tubular shape, wherein resins to form the respective layers, are kneaded and melted in two or more extruders provided with screws and the molten resins discharged from discharge outlets, will be extruded through dies provided at the forward ends of the extruders, while being contacted with each other in the molten state, to form a multi-layer.

With respect to the extrusion temperature, the screw temperature is preferably from 100 to 350° C., and the die temperature is preferably from 200 to 350° C. Further, the screw rotational rate is not particularly limited, but it is usually preferably from 10 to 200 rpm, and the retention time of the melts in the extruders is preferably from 1 to 20 minutes.

Further, usually, the respective resins of the outer layer and the inner layer are preferably preliminarily pelletized. Namely, predetermined amounts of resins and various additives such as a plasticizer, to be mixed to the fluorocopolymer or to the terminal modified polyamide 12 or the like, are mixed by a low rate rotary mixer such as a V-formed blender or a tumbler or by a high rate rotary mixer such as a Henschel mixer, and then melt-kneaded by e.g. a single screw extruder, a twin screw extruder or a twin screw kneader and pelletized. A material which is liquid at room temperature, such as a plasticizer, may be injected to the cylinder of the melt kneading machine and melt-kneaded.

The pelletizing is preferably carried out by mechanical kneading at a temperature where all resin components will be melted, followed by pelletizing. Particularly for uniform mixing, it is preferred to employ a co-rotating twin screw extruder.

Further, it is also preferred that at the time of carrying out the coextrusion, all elements to constitute the compositions on the respective layers are supplied to hoppers of the respective extruders, and compounding, grafting, etc. of the respective layers are carried out in the respective extruders, followed by coextrusion, whereby compounding, grafting, etc. and coextrusion are carried out substantially at the same time.

In a case where the multi-layer hose of the present invention has a complicated shape or in a case where heat bending is applied after forming the multi-layer hose, to obtain a final shaped product, in order to remove a residual strain of such a shaped product, heat treatment (anneal treatment) may be carried out for from 0.01 to 10 hours at a temperature lower than the lowest melting point among melting points of resins constituting the multi-layer hose, after forming the multi-layer hose, whereby the desired shaped product of a multi-layer hose having no strain can be obtained.

Further, the multi-layer hose of the present invention may be one having a waveform region. The waveform region is a region formed into a waveform shape, a bellows shape, an accordion shape or a corrugated shape. Such a waveform region may be formed over the entire length of the multi-layer hose, or may be provided partially at a suitable region.

The waveform region may be easily formed by firstly forming a straight tubular hose, followed by molding to a predetermined waveform shape. A multi-layer hose having such a waveform region has a shock-absorbing property and will be easy to attach. Further, for example, a necessary component such as a connector may be attached, or by bending, it may be formed into a shape of e.g. letter L or letter U.

To the multi-layer hose thus molded, a protective material (protector) may be provided in consideration of flying stone, abrasion with other components or flame resistance. Namely, a solid or spongy protective material made of epichlorohydrin rubber, NBR, a mixture of NBR with polyvinyl chloride, chlorosulfonated polyethylene rubber, chlorinated polyethylene rubber, acryl rubber (ACM), chloroprene rubber (CR), ethylene/propylene rubber (EPR), ethylene/propylene/diene rubber (EPDM), a mixed rubber of NBR with BPDM, or a thermoplastic elastomer of e.g. vinyl chloride type, olefin type, ester type or amide type, may be provided over the entire outer circumference of the multi-layer hose or on a part thereof.

Such a protective material may be formed into a spongy porous body by a conventional method. By forming into such a porous body, a protective portion light in weight and excellent in heat shielding properties, can be formed. Further, the cost for the material can be reduced. Otherwise, glass fiber, etc. may be incorporated to improve the strength.

The shape of the protective material is not particularly limited, but usually, it is a cylindrical material or a block-shaped material having a recess to receive the multi-layer hose. In the case of a cylindrical material, the multi-layer hose may be inserted into a preliminarily prepared cylindrical material, or the cylindrical material may be extruded on the multi-layer hose for covering thereby to let them closely contact each other. To let them adhere to each other, an adhesive may be coated on the inner surface or the above-mentioned recess of the protective material, and the multi-layer hose is then inserted or fit therein to let them adhere thereby to form a structure in which the multi-layer hose and the protective material are unified. Further, they may be reinforced by e.g. a metal.

The multi-layer hose of the present invention is useful for various applications including automobile parts, internal combustion applications, machine parts such as power tool housings, as well as industrial materials, electric and electronic parts, medical instruments, food products, household or office equipments, building material parts, furniture components and household appliances.

Further, the multi-layer hose of the present invention is excellent in the fuel barrier property and chemical resistance and thus useful for a pipe for transporting a chemical fluid. Such a chemical fluid may, for example, be gasoline, kerosine, diesel gasoline, methanol, ethanol, isopropanol, isobutanol, butanol, alcohol-containing gasoline, methyl t-butyl ether, oxygen-containing gasoline, amine-containing gasoline, sour gasoline, a caster oil-based brake fluid, a glycol ester-type brake fluid, a borate-type brake fluid, a break fluid for very cold regions, a silicone oil-type brake fluid, a mineral oil-type brake fluid, power steering oil, a window washing fluid, an engine cooling fluid, a medicine, an ink or a coating material.

The multi-layer hose of the present invention is suitable as a hose for transporting the above-mentioned chemical fluid. Specifically, it may, for example, be a hose for a fuel such as a feed hose, a return hose, an evaporation hose, a fuel filler hose, an ORVR hose, a reserve hose or a vent hose, an oil tube, a break hose, a window washer hose, a radiator hose, a cooler hose for cooling water or a cooling medium, a cooling medium hose for an air conditioner, a hose for floor heating, a hose for a fire extinguisher or fire extinguishing installation, a hose for a medical cooling equipment, a hose for spraying an ink or coating material or a hose for other chemical fluids.

The hose of the present invention can be used even at a high temperature and is useful, for example, as a hose for transporting a high temperature chemical fluid or gas. Further, it is particularly useful as a hose for a fuel.

Now, the present invention will be described in further detail with reference to Examples and Comparative Examples, but it should be understood that the present invention is by no means restricted thereto.

(1) The characteristics and physical properties of the polyamide resin, the fluorocopolymer and the multi-layer hose were measured as follows.

(i) The characteristics of the polyamide resin were measured by the following method.

Terminal Carboxyl Group Concentration

A predetermined amount of a polyamide sample was put into a three-necked eggplant type flask, and 40 mL of benzyl alcohol was added. Then, the flask was immersed in an oil bath set at 180° C., in a nitrogen stream. The sample was stirred and dissolved by a stirring motor attached at an upper portion, and titration was carried out with N/20 potassium hydroxide (ethanol solution) using phenol phthalein as an indicator, whereupon the concentration of terminal carboxyl groups ($\mu$eq/g) was obtained by the following formula:

[COOH]=COOH eq/$10^5$ g

Terminal Amino Group Concentration

A predetermined amount of a polyamide sample was put into a flask provided with a turncock, and 40 mL of solvent phenol/methanol (volume ratio: 9/1) preliminarily prepared, was added. Then, the sample was dissolved with stirring by a magnet stirrer, and titration was carried out with N/20 hydrochloric acid using thymol blue as an indicator, whereupon the concentration of terminal amino groups ($\mu$eq/g) was obtained by the following formula.

[NH$_2$]=NH$_2$ eq/$10^5$ g

Relative Viscosity ($\eta_r$)

In accordance with JIS K6920, a polyamide sample was completely dissolved at a concentration of 10 g/dm$^3$ using 96 mass % sulfuric acid as a solvent, whereupon the relative viscosity was measured at 25° C. by means of a Ubbelohde viscometer.

(ii) Further, the characteristics of the fluorocopolymer were measured by the following methods.

Polymer Composition

Measured by a melt NMR analysis, a fluorine content analysis and an infrared absorption spectrum analysis, particularly, with respect to the content of polymerized units based on itaconic anhydride (IAN) or citraconic anhydride (CAN), the absorption peak by stretching vibration of C=O in the polymerized units appears at 1,870 cm$^{-1}$ in each case, and accordingly, the absorbance of the absorption peak was measured, and the content M (mol %) of polymerized units based on IAN or CAN was determined by using a relation formula of M=aL. Here, L is the absorbance at 1,870 cm$^{-1}$, and a is a coefficient. As a, a=0.87 determined by using IAN as a model compound, was used.

Melting Point

Using a DSC apparatus (manufactured by Seiko Instruments Co., Ltd.), the sample was melted at a temperature raising rate of 10° C./min, whereby the peak temperature in the melting curve was taken as the melting point.

Volume Flow Rate (Value Q)

Using a flow tester (manufactured by Shimadzu Corporation), the fluorocopolymer was extruded at a temperature of 297° C. under a load of 7 kg into an orifice having a diameter of 2.1 mm and a length of 8 mm, whereby the extrusion rate of the fluorocopolymer was taken as the volume flow rate.

(iii) Various physical properties of the multi-layer hose were measured by the following methods.

Low Temperature Impact Resistance

Evaluated by the method disclosed in SAE J2260.

Interlayer Adhesion Strength

The multi-layer hose was cut into a length of 20 cm, which was further cut lengthwise to obtain a test piece. The outer layer and the inner layer were forcibly peeled for 1 cm from an end, and using a tensilon universal tester as an instrument, the outer layer and the inner layer were clamped and subjected to a 180° peel test at a tensile speed of 50 mm/min. The highest strength was read from the maximum point of the S-S curve and was taken as interlayer adhesion strength (N/cm).

Further, "peeling impossible" in Table 1 given hereinafter, means that the layers were so firmly adhered that it was impossible to prepare the above-mentioned test peace by peeling the outer layer and the inner layer, i.e. the adhesion was extremely good.

Electroconductivity

Measured in accordance with SAE J2260

Fuel Barrier Property

The multi-layer hose was cut into a length of 1 m, which was used as a test sample. The sample was dried at 110° C. for two hours, whereupon the mass measurement was carried out, and then, alcohol/gasoline (CE10) prepared by mixing Fuel C (isooctane/toluene=50/50 by volume ratio) and ethanol in a volume ratio of 90/10, was sealed therein, whereupon both ends were sealed.

This sample was set in a constant temperature vessel of 60° C., and upon expiration of 24 hours, the hose was taken out. When the temperature returned to room temperature, the mass measurement was carried out. The change in mass was divided by the inner layer surface area and 24 hours (1 day) to obtain a fuel permeability coefficient (g/m$^2$·day). The smaller this fuel permeability coefficient, the better the fuel barrier property.

The fuel permeability coefficient is preferably less than 20 (g/m$^2$·day), more preferably less than 15 (g/m$^2$·day), most preferably less than 10 (g/m$^2$·day).

Further, in order to secure an adequate fuel barrier property, the thickness of the inner layer (I) made of the fluorocopolymer is preferably at least 0.1 mm. Particularly preferably, the inner layer (I) is combined with an inner layer (I') made of another fluorinated resin layer to form a layer structure of at least two layers, and the total thickness is preferably made to be at least 0.1 mm.

Fuel Resistance of Interlayer Adhesion Strength

A multi-layer hose was cut into a length of 20 cm, which was used as a test sample. In this sample, alcohol/gasoline (CM15) prepared by mixing Fuel C (isooctane/toluene=50/50 by volume ratio) and ethanol in a volume ratio of 85/15, was sealed, whereupon both ends were sealed. This sample was set in a constant temperature vessel of 60° C. and maintained for 1,000 hours. Then, it was opened, and the sealed substance was removed. Then, the hose was dried, and by the above-described method, the adhesion strength was measured, and the fuel resistance of interlayer adhesion strength was evaluated.

(2) Firstly, pellets of polyamide 12 or the like and the fluoropolymer to be used for forming the outer layer and the inner layer of a multi-layer hose, were prepared by the following Preparation Examples 1 to 15.

PREPARATION EXAMPLE 1

Preparation of (PA-1) Polyamide 12

Into a 70 L autoclave, 20 kg of ω-laurolactam, 0.5 kg of water and 49.3 g of isophoronediamine (1/350 eq/mol laurolactam) were charged, and the interior of the autoclave was flushed with nitrogen. Then, the temperature in the autoclave was raised to 260° C., and while adjusting the inner pressure to 3.5 MPa, polymerization was carried out for two hours with stirring. Whereafter, the pressure was released to atmospheric pressure over a period of about 2 hours, then, the pressure was reduced to 0.05 MPa, and polymerization was carried out under reduced pressure for 4 hours. Then, nitrogen was introduced into the autoclave, and the pressure was returned to normal pressure, whereupon the polymer was withdrawn as strands from nozzles at a lower portion of the reactor and subjected to cutting to obtain pellets, which were then dried under reduced pressure.

The obtained polymer had a relative viscosity of 2.26, a terminal amino group concentration of 47 μeq/g and a terminal carboxyl group concentration of 19 μeq/g (hereinafter, this polyamide 12 will be referred to as "(PA-1) polyamide 12" or simply as "(PA-1)"). Further, (terminal amino group concentration)/(terminal carboxyl group concentration)=2.47>1.

PREPARATION EXAMPLE 2

Preparation of (PA-2) Polyamide 12

A polymer was obtained in the same manner as in Preparation Example 1 except that in the preparation of (PA-1) polyamide 12 in Preparation Example 1, 49.3 g of isophoronediamine (1/350 eq/mol laurolactam) was changed to 17.6 g of hexamethylenediamine (1/670 eq/mol laurolactam), and the degree of reduced pressure was changed from 0.05 MPa to 0.08 MPa.

The obtained polymer had a relative viscosity of 2.30, a terminal amino group concentration of 38 μeq/g and a terminal carboxyl group concentration of 20 μeq/g (hereinafter, this polyamide 12 will be referred to as "(PA-2) polyamide 12" or simply as "(PA-2)"). Further, (terminal amino group concentration)/(terminal carboxyl group concentration)=1.9>1.

PREPARATION EXAMPLE 3

Preparation of (PA-3) Polyamide 12

A polymer was obtained in the same manner as in Preparation Example 1 except that in the preparation of (PA-1) polyamide 12 in Preparation Example 1, 49.3 g of isophoronediamine (1/350 eq/mol laurolactam) was changed to 28.8 g of stearic acid (1/1,000 eq/mol laurolactam), and the degree of reduced pressure was changed from 0.05 MPa to 0.08 MPa.

The obtained polymer had a relative viscosity of 2.25, a terminal amino group concentration of 27 μeq/g and a terminal carboxyl group concentration of 35 μeq/g (hereinafter, this polyamide 12 will be referred to as "(PA-3) polyamide 12" or simply as "(PA-3)"). Further, (terminal amino group concentration)/(terminal carboxyl group concentration)=0.77<1.

PREPARATION EXAMPLE 4

(A-1) Preparation of a Resin Composition of (PA-1) Polyamide 12

To (PA-1) prepared as described above, maleic acid-modified ethylene/propylene rubber (JIR T7712SP (manufactured by JSR Company)) was preliminarily mixed as an impact resistance-improving material, and the mixture was supplied to a twin screw melt kneader (model TEX 44, manufactured by Japan Steel Works, Ltd.). On the other hand, to the cylinder of the twin screw extruder, benzene sulfonic acid butylamide was injected as a plasticizer by a metering pump. Melt-kneading was carried out at a cylinder temperature of from 180 to 260° C., and the molten resin was extruded in the form of strands, which were introduced into a water bath, cooled, cut and vacuum-dried to obtain pellets of a polyamide 12 resin composition having a composition comprising 85 mass % of polyamide 12 resin, 10 mass % of the impact resistance-improving material and 5 mass % of the plasticizer (hereinafter, this polyamide 12 resin composition or its pellets will be referred to as "polyamide 12 resin composition (A-1)").

PREPARATION EXAMPLE 5

(A-2) Preparation of a Resin Composition of (PA-2) Polyamide 12

Pellets of a polyamide 12 resin composition having a composition comprising 95 mass % of polyamide 12 resin and 5 mass % of the plasticizer, were obtained in the same manner as in the preparation for the above polyamide 12 resin composition (A-1) except that no impact resistance-improving material was used in Preparation Example 4. (Hereinafter, this polyamide 12 resin composition or its pellets will be referred to as "polyamide 12 resin composition (A-2)").

PREPARATION EXAMPLE 6

(A-3) Preparation of a Resin Composition of (PA-3) Polyamide 12

Pellets of a polyamide 12 resin composition having a composition comprising 85 mass % of polyamide 12 resin, 10 mass % of the impact resistance-improving material and 5 mass % of the plasticizer, were obtained in the same manner as in the preparation for the above polyamide 12 resin composition (A-1) except that in Preparation Example 4, the impact resistance-improving material was changed from the maleic acid modified ethylene/propylene rubber to a polyamide elastomer (UBE Polyamide Elastmer PAE1202U (manufactured by Ube Industries, Ltd.)).

(Hereinafter, this polyamide 12 resin composition or its pellets will be referred to as "polyamide 12 resin composition (A-3)").

PREPARATION EXAMPLE 7

(A-4) Preparation of a Resin Composition of (PA-2) Polyamide 12

Pellets of a polyamide 12 resin composition having a composition comprising 85 mass % of polyamide 12 resin, 10 mass % of the impact resistance-improving material and 5 mass % of the plasticizer, were obtained in the same manner as in the preparation for the above polyamide 12 resin composition (A-1) except that in Preparation Example 4, (PA-1) was changed to (PA-2). (Hereinafter, this polyamide 12 resin composition or its pellets will be referred to as "polyamide 12 resin composition (A-4)").

PREPARATION EXAMPLE 8

(A-5) Preparation of a Resin Composition of (PA-3) Polyamide 12

Pellets of a polyamide 12 resin composition having a composition comprising 85 mass % of polyamide 12 resin, 10 mass % of the impact resistance-improving material and 5 mass % of the plasticizer, were obtained in the same manner as in the preparation for the above polyamide 12 resin composition (A-1) except that in Preparation Example 4, (PA-1) was changed to (PA-3). (Hereinafter, this polyamide 12 resin composition or its pellets will be referred to as "polyamide 12 resin composition (A-5)").

PREPARATION EXAMPLE 9

(B-1) Preparation of IAN Polymerized Units-containing Fluorocopolymer

An autoclave having an internal capacity of 94 L and equipped with a stirrer, was deaerated, and 71.3 kg of 1-hydrotridecafluorohexane (hereinafter referred to as "HPFH"), 20.4 kg of AK225cb as a chain transfer agent, 562 g of $CH_2=CH(CF_2)_2F$ and 4.45 g of IAN were charged. The interior of the autoclave was heated to 66° C., and the pressure was raised to 1.5 MPa/G with a gas of TFE/E (molar ratio: 89/11). As a polymerization initiator, 1 L of a 0.7% HPFH solution of tert-butyl peroxypivalate was charged to initiate the polymerization.

A monomer mixture gas of TFE/E (molar ratio: 59.5/40.5) was continuously charged to maintain the pressure to be constant during the polymerization. Further, $CH_2=CH(CF_2)_2F$ in an amount corresponding to 3.3 mol % and IAN in an amount corresponding to 0.8 mol %, based on the total molar amount of TFE and E charged during the polymerization, were continuously charged in the form of a 1% solution of AK225cb. After 9.9 hours from the initiation of the polymerization and when 7.28 kg of the monomer mixture gas was charged, the internal temperature of the autoclave was lowered to room temperature, and purging was carried out to normal pressure.

The obtained IAN polymerized units-containing fluorocopolymer in a slurry form was put into a 200 L granulator charged with 77 kg of water and granulated by raising the temperature to 105° C. with stirring, while distilling the solvent off. The obtained granules were dried at 150° C. for 15 hours to obtain 6.9 kg of granules of the fluorocopolymer.

From the results of the melt NMR analysis, the fluorine content analysis and the infrared absorption spectrum analysis, the composition of the fluorocopolymer was found to have a molar ratio of polymerized units based on TFE/polymerized units based on E/polymerized units based on IAN/polymerized units based on $CH_2=CH(CF_2)_2F$ being 57.2/38.5/0.48/3.5. Further, the melting point was 230° C., and value Q was 48 $mm^3$/sec.

By means of an extruder, the granules were melted at 280° C. for a retention time of two minutes to prepare pellets of the fluorocopolymer. (Hereinafter, the pellets will be referred to as "IAN polymerized units-containing fluorocopolymer (B-1)" or simply as "(B-1)".)

PREPARATION EXAMPLE 10

(B-2) Preparation of CAN Polymerized Units-containing Fluorocopolymer 8.2 kg of granules of CAN polymerized units-containing fluorocopolymer were obtained in the same manner as in Preparation Example 9 except that prior to the polymerization, 97.6 kg of HPFH, 10.8 kg of AK225cb and instead of IAN, 7.2 g of CAN, were charged, and during the polymerization, instead of IAN, CAN was charged. The polymerization time was 7.4 hours. From the results of the melt NMR analysis, the fluorine content analysis and the infrared absorption spectrum analysis, the composition of the fluorocopolymer was found to have a molar ratio of polymerized units based on TFE/polymerized units based on E/polymerized units based on CAN/polymerized units based on $CH_2=CH(CF_2)_2F$ being 49.2/46.9/0.26/3.6. Further, the melting point was 233° C., and value Q was 65 $mm^3$/sec.

By means of an extruder, the granules were melted at 280° C. for a retention time of two minutes to prepare pellets of the fluorocopolymer. (Hereinafter, the pellets will be referred to as "CAN polymerized units-containing fluorocopolymer (B-2)" or simply as "(B-2)".)

PREPARATION EXAMPLE 11

(B-3) Preparation of Electroconductive IAN Polymerized Units-containing Fluorocopolymer 100 parts by mass of the resin (IAN polymerized units-containing fluorocopolymer (B-1)) prepared in Preparation Example 9 and 13 parts by mass of carbon black (manufactured by Denki Kagaku Kogyo K.K.) were supplied to a co-rotating twin screw extruder (TEM-48SS, manufactured by Toshiba Machine Co., Ltd.) and kneaded at a melt zone temperature of the cylinder of 300° C. for a retention time of 5 minutes.

The discharged strands were cooled with water, and the strands were cut by a pelletizer, and dried at 120° C. for 10 hours by a drier to remove the moisture, to obtain pellets. (Hereinafter, the pellets will be referred to as "electroconductive IAN polymerized units-containing fluorocopolymer (B-3)" or simply as "(B-3)".)

PREPARATION EXAMPLE 12

(B-4) Preparation of Graft MAN-modified Fluorocopolymer 7.0 kg of granules of a fluorocopolymer were obtained by carrying out the polymerization in the same manner as in Preparation Example 9 except that in Preparation Example 9, no IAN was charged.

From the results of the melt NMR analysis, the fluorine content analysis and the infrared absorption spectrum analysis, the composition of the fluorocopolymer was found to have a molar ratio of polymerized units based on TFE/polymerized units based on E/polymerized units based on $CH_2=CH(CF_2)_2F$ being 57.6/38.7/3.7. Further, the melting point was 232° C., and value Q was 35 $mm^3$/sec.

100 parts by mass of the granules, 1.5 parts by mass of maleic anhydride (sometimes referred to as "MAN" in Examples) and 0.2 part by mass of tert-butyl hydroperoxide, were supplied to a co-rotating twin screw extruder and kneaded at a melt zone temperature of the cylinder of 300° C. for a retention time of 5 minutes.

The discharged strands were cooled with water, and the strands were cut by a pelletizer, and dried at 120° C. for 10 hours by a drier to remove the moisture, to obtain pellets. (Hereinafter, the pellets will be referred to as "graft MAN-modified fluorocopolymer (B-4)" or simply as "(B-4)".)

PREPARATION EXAMPLE 13

(B-5) Preparation of Electroconductive Graft MAN-modified Fluorocopolymer 100 parts by mass of the granules of the fluorocopolymer used for the preparation of (B-4) in Preparation Example 12, 1.5 parts by mass of maleic anhydride, 0.2 part by mass of tert-butyl hydroperoxide and 13 parts by mass of carbon black, were supplied to a co-rotating twin screw extruder and kneaded at a melt zone temperature of the cylinder of 300° C. for a retention time of 5 minutes.

The discharged strands were cooled with water, and the strands were cut by a pelletizer, and dried at 120° C. for 10 hours by a drier to remove the moisture, to obtain pellets. (Hereinafter, the pellets will be referred to as "electroconductive graft MAN-modified fluorocopolymer (B-5)" or simply as "(B-5)".)

PREPARATION EXAMPLE 14

(B-6) Preparation of a Fluorocopolymer Mixture (Blend)

20 parts by mass of the granules of the fluorocopolymer used for the preparation of (B-1) and 80 parts by mass of the granules of the fluorocopolymer used for the preparation of (B-4) were mixed and melted at 280° C. for a retention time of two minutes by means of an extruder to prepare pellets of the fluorocopolymer. (Hereinafter, the pellets will be referred to as "fluorocopolymer mixture (B-6)" or simply as "(B-6)".)

PREPARATION EXAMPLE 15

(B-7) Preparation of Electroconductive Fluorocopolymer Mixture (Blend)

20 parts by mass of the granules of the fluorocopolymer used for the preparation of (B-1), 80 parts by mass of the granules of the fluorocopolymer used for the preparation of (B-4) and 13 parts by mass of carbon black were mixed and supplied to a co-rotating twin screw extruder and kneaded at a melt zone temperature of the cylinder of 300° C. for a retention time of 5 minutes.

The discharged strands were cooled with water, and the strands were cut by a pelletizer, and dried at 120° C. for 10 hours by a drier to remove the moisture, to obtain pellets. (Hereinafter, the pellets will be referred to as "electroconductive fluorocopolymer mixture (B-7)" or simply as "(B-7)".)

(3) In the following Examples 1 to 9 and Comparative Examples 1 to 6, hoses were formed by coextrusion using mainly the polyamide resins and the fluorocopolymers obtained as described above.

EXAMPLE 1

Using the above-mentioned polyamide 12 resin composition (A-1) and IAN polymerized units-containing fluorocopolymer (B-1) and by means of a double layer hose processing machine manufactured by Plabor, (A-1) and (B-1) were separately melted at an extrusion temperature of 250° C. and at an extrusion temperature of 290° C., respectively, and the extruded molten resins were joined by a co-extrusion die to form a multi-layer tube. Then, it was cooled by a sizing die to control the dimension and wound to obtain a multi-layer hose comprising a layer (II) (outer layer) made of (A-1) and a layer (I) (inner layer) made of (B-1) to have a layer construction as identified in Table 1, with their thicknesses (II)/(I)=0.75/0.25 mm and having an inner diameter of 6 mm and an outer diameter of 8 mm. The physical properties of the multi-layer hose were measured, and the results are shown in Table 1.

In the Table, "peeling impossible" for the interlayer adhesion strength means, as mentioned above, that the layers are so firmly adhered that it is impossible to prepare the above-mentioned test sample by peeling the outer layer and the inner layer, i.e. the interlayer adhesion strength is extremely good.

Thus, it is evident that the multi-layer hose of the present invention has an interlayer adhesion strength being "peeling impossible" not only at the initial stage but also even after soaked in a fuel for 1,000 hours, and thus is excellent in the fuel resistance of the interlayer adhesion strength.

EXAMPLE 2

A multi-layer hose having a layer construction ((II)/(I)) as identified in Table 1, was obtained in the same manner as in Example 1 except that the IAN polymerized units-containing fluorocopolymer (B-1) of the layer (I) (inner layer) in Example 1 was changed to CAN polymerized units-containing fluorocopolymer (B-2). The physical properties of the multi-layer hose were measured, and the results are shown in Table 1.

EXAMPLE 3

A multi-layer hose having a layer construction ((II)/(I)) as identified in Table 1, was obtained in the same manner as in Example 1 except that the IAN polymerized units-containing fluorocopolymer (B-1) of the layer (I) (inner layer) in Example 1 was changed to electroconductive IAN polymerized units-containing fluorocopolymer (B-3). The physical properties of the multi-layer hose were measured, and the results are shown in Table 1. Further, the electrical conductivity of the multi-layer hose was measured in accordance with SAE J2260 and found to be not higher than $10^6$ Ω/square, whereby it was confirmed that the multi-layer hose was excellent in the static electricity-removing performance.

EXAMPLE 4

A multi-layer hose having a layer construction ((II)/(I)) as identified in Table 1, was obtained in the same manner as in Example 1 except that the polyamide 12 resin composition (A-1) of the layer (II) (outer layer) in Example 1 was changed to polyamide 12 resin composition (A-2). The physical properties of the multi-layer hose were measured, and the results are shown in Table 1.

EXAMPLE 5

A multi-layer hose having a layer construction ((II)/(I)) as identified in Table 1, was obtained in the same manner as in Example 1 except that the polyamide 12 resin composition 12 (A-1) of the layer (II) (outer layer) in Example 1 was changed to polyamide 12 resin composition (A-3). The physical properties of the multi-layer hose were measured, and the results are shown in Table 1.

EXAMPLE 6

A multi-layer hose having a layer construction ((II)/(I)) as identified in Table 1, was obtained in the same manner as in Example 1 except that the polyamide 12 resin composition 12 (A-1) of the layer (II) (outer layer) in Example 1 was changed to polyamide 12 (PA-1). The physical properties of the multi-layer hose were measured, and the results are shown in Table 1.

EXAMPLE 7

A multi-layer hose having a layer construction ((II)/(I)) as identified in Table 1, was obtained in the same manner as in Example 1 except that the polyamide 12 resin composition 12 (A-1) of the layer (II) (outer layer) in Example 1 was changed to polyamide 12 resin composition (A-4). The physical properties of the multi-layer hose were measured, and the results are shown in Table 1.

EXAMPLE 8

Using the above-mentioned polyamide 12 (A-1), IAN polymerized units-containing fluorocopolymer (B-1) and electroconductive IAN polymerized units-containing fluorocopolymer (B-3) and by means of a three layer hose processing machine manufactured by Plabor, (A-1), (B-1) and (B-3) were separately melted at an extrusion temperature of 250° C., at an extrusion temperature of 290° C. and at an extrusion temperature of 310° C., respectively, and the extruded molten resins were joined by a co-extrusion die to form a multi-layer tube.

Then, the multi-layer tube was cooled by a sizing die to control the dimension and wound to obtain a multi-layer hose having a layer construction comprising a layer (II) (outer layer) made of (A-1), a layer (I) (interlayer (inner layer)) made of (B-1) and a layer (I') (innermost layer) made of (B-3) with their thicknesses (II)/(I)/(I')=0.75/0.1/0.15 mm and having an inner diameter of 6 mm and an outer diameter of 8 mm. The physical properties of the multi-layer hose were measured, and the results are shown in Table 1.

Further, the electrical conductivity of the multi-layer hose was measured in accordance with SAE J2260 and found to be not higher than $10^6$ Ω/square, whereby it was confirmed that the multi-layer hose was excellent in the static electricity-removing performance.

EXAMPLE 9

Using the above-mentioned polyamide 12 resin composition (A-5), (PA-1) polyamide 12 and IAN polymerized units-containing fluorocopolymer (B-1) and by means of a three layer hose processing machine manufactured by Plabor, (A-5), (PA-1) and (B-1) were separately melted at an extrusion temperature of 250° C., at an extrusion temperature of 250° C. and at an extrusion temperature of 290° C., respectively, and the extruded molten resins were joined by a co-extrusion die to form a multi-layer tube.

Then, the multi-layer tube was cooled by a sizing die to control the dimension and wound to obtain a multi-layer hose comprising a layer (II') (outermost layer) made of (A-5), a layer (II) (interlayer (outer layer)) made of (A-1) and a layer (I) (inner layer) made of (B-1) to have the layer construction ((II')/(II)/(I)) as identified in Table 1, with their thicknesses (II')/(II)/(I)=0.65/0.1/0.25 mm and having an inner diameter of 6 mm and an outer diameter of 8 mm. The physical properties of the multi-layer hose were measured, and the results are shown in Table 1.

EXAMPLE 10

A multi-layer hose having a layer construction ((II')/(II)/(I))as identified in Table 1, was obtained in the same manner as in Example 9 except that in Example 9, (PA-1) polyamide 12 was changed to (PA-2). The physical properties of the multi-layer hose were measured, and the results are shown in Table 1.

COMPARATIVE EXAMPLE 1

A multi-layer hose having a layer construction ((II')/(I)) as identified in Table 1, was obtained in the same manner as in Example 1 except that in Example 1, the polyamide 12 resin composition (A-1) was changed to (A-5). The physical properties of the multi-layer hose were measured, and the results are shown in Table 1.

COMPARATIVE EXAMPLE 2

A multi-layer hose having a layer construction ((II')/(I')) as identified in Table 1, was obtained in the same manner as in Comparative Example 1 except that in Comparative Example 1, the IAN polymerized units-containing fluorocopolymer (B-1) was changed to graft MAN-modified fluorocopolymer (B-4) The physical properties of the multi-layer hose were measured, and the results are shown in Table 1.

COMPARATIVE EXAMPLE 3

A multi-layer hose having a layer construction ((II)/(I')) as identified in Table 1, was obtained in the same manner as in Example 1 except that in Example 1, the IAN polymerized units-containing fluorocopolymer (B-1) was changed to graft MAN-modified fluorocopolymer (B-4). The physical properties of the multi-layer hose were measured, and the results are shown in Table 1.

COMPARATIVE EXAMPLE 4

A multi-layer hose having a layer construction ((II)/(I')) as identified in Table 1, was obtained in the same manner as in Example 1 except that in Example 1, the IAN polymerized units-containing fluorocopolymer (B-1) was changed to electroconductive graft MAN-modified fluorocopolymer (B-5). The physical properties of the multi-layer hose were measured, and the results are shown in Table 1. Further, the electrical conductivity of the multi-layer hose was measured in accordance with SAE J2260 and found to be not higher than $10^6$ Ω/square, whereby it was confirmed that the multi-layer hose was excellent in the static electricity-removing performance.

COMPARATIVE EXAMPLE 5

A multi-layer hose having a layer construction ((II')/(I)/(I')) as identified in Table 1, was obtained in the same manner as in Example 8 except that in Example 8, the polyamide 12 resin composition (A-1) was changed to (A-5), and the conductive IAN polymerized units-containing fluorocopolymer (B-3) was changed to electroconductive graft MAN-modified fluorocopolymer (B-5). The physical properties of the multi-layer hose were measured, and the results are shown in Table 1. Further, the electrical conductivity of the multi-layer hose was measured in accordance with SAE J2260 and found to be not higher than $10^6$ Ω/square, whereby it was confirmed that the multi-layer hose was excellent in the static electricity-removing performance.

COMPARATIVE EXAMPLE 6

A hose as identified in Table 1 was obtained in the same manner as in Example 1 except that in Example 1, no IAN polymerized units-containing fluorocopolymer (B-1) was used. The physical properties of the hose were measured, and the results are shown in Table 1.

EXAMPLE 11

A multi-layer hose having a layer construction ((II)/(I)) as identified in Table 1, was obtained in the same manner as in Example 1 except that in Example 1, the IAN polymerized units-containing fluorocopolymer (B-1) was changed to fluorocopolymer mixture (B-6). The physical properties of the multi-layer hose were measured, and the results are shown in Table 1.

EXAMPLE 12

A multi-layer hose having a layer construction ((II)/(I)) as identified in Table 1, was obtained in the same manner as in Example 1 except that in Example 1, the IAN polymerized units-containing fluorocopolymer (B-1) was changed to electroconductive fluorocopolymer mixture (B-7). The physical properties of the multi-layer hose were measured, and the results are shown in Table 1. Further, the electrical conductivity of the multi-layer hose was measured in accordance with SAE J2260 and found to be not higher than $10^6$ Ω/square, whereby it was confirmed that the multi-layer hose was excellent in the static electricity-removing performance.

As shown in Table 1, the multi-layer hose of the present invention is excellent in the interlayer adhesion strength and particularly has long lasting fuel resistance of the excellent interlayer adhesion strength without no decrease in the interlayer adhesion strength even upon expiration of 1,000 hours after soaked in a fuel. Further, it is excellent also in the fuel barrier property and further has high low temperature impact resistance, and thus it can be used suitably as a multi-layer hose.

Further, in the present invention, the fluorocopolymer constituting the inner layer has a merit in that functional groups required to improve the fuel resistance of the interlayer adhesion strength can be introduced solely by a polymerization step without necessity to carry out a grafting step following a polymerization step as heretofore required.

On the other hand, in the present invention, the polyamide resin constituting the outer layer satisfies the specific condition for the terminal group concentrations, whereby not only it is excellent in the initial adhesion with the fluorocopolymer having functional groups, but also it is capable of

TABLE 1

| | Outer layer (II), (II') | | Interlayer (I), (II) | | Innerlayer (I), (I') | | Low temperature impact resistance | Fuel permeability coefficient | Interlayer adhesion strength (N/cm) | |
|---|---|---|---|---|---|---|---|---|---|---|
| | Type | Thickness (mm) | Type | Thickness (mm) | Type | Thickness (mm) | (broken number/ tested number) | (CE10, 60° C.) (g/m² · day) | Initial | After soaked in fuel for 1,000 hours |
| Ex. 1 | A-1 | 0.75 | — | — | B-1 | 0.25 | 0/10 | 9.5 | Peeling impossible | Peeling impossible |
| Ex. 2 | A-1 | 0.75 | — | — | B-2 | 0.25 | 0/10 | 9.5 | Peeling impossible | Peeling impossible |
| Ex. 3 | A-1 | 0.75 | — | — | B-3 | 0.25 | 0/10 | 8 | Peeling impossible | Peeling impossible |
| Ex. 4 | A-2 | 0.75 | — | — | B-1 | 0.25 | 0/10 | 9.5 | Peeling impossible | Peeling impossible |
| Ex. 5 | A-3 | 0.75 | — | — | B-1 | 0.25 | 0/10 | 9.5 | Peeling impossible | Peeling impossible |
| Ex. 6 | PA-1 | 0.75 | — | — | B-1 | 0.25 | 0/10 | 9.0 | Peeling impossible | Peeling impossible |
| Ex. 7 | A-4 | 0.75 | — | — | B-1 | 0.25 | 0/10 | 9.5 | Peeling impossible | Peeling impossible |
| Ex. 8 | A-1 | 0.75 | B-1 | 0.1 | B-3 | 0.15 | 0/10 | 9 | Peeling impossible | Peeling impossible |
| Ex. 9 | A-5 | 0.65 | PA-1 | 0.1 | B-1 | 0.25 | 0/10 | 9 | Peeling impossible | Peeling impossible |
| Ex. 10 | A-5 | 0.65 | PA-2 | 0.1 | B-1 | 0.25 | 0/10 | 9 | Peeling impossible | Peeling impossible |
| Comp. Ex. 1 | A-5 | 0.75 | — | — | B-1 | 0.25 | 0/10 | 10 | Peeling impossible | 29 |
| Comp. Ex. 2 | A-5 | 0.75 | — | — | B-4 | 0.25 | 0/10 | 10 | 40 | 12 |
| Comp. Ex. 3 | A-1 | 0.75 | — | — | B-4 | 0.25 | 0/10 | 10 | 45 | 15 |
| Comp. Ex. 4 | A-1 | 0.75 | — | — | B-5 | 0.25 | 0/10 | 9 | 48 | 17 |
| Comp. Ex. 5 | A-5 | 0.75 | B-1 | 0.1 | B-5 | 0.15 | 0/10 | 9 | Peeling impossible | 31 |
| Comp. Ex. 6 | A-1 | 1 | — | — | — | — | 0/10 | 80 | — | — |
| Ex. 11 | A-1 | 0.75 | — | — | B-6 | 0.25 | 0/10 | 6 | Peeling impossible | Peeling impossible |
| Ex. 12 | A-1 | 0.75 | — | — | B-7 | 0.25 | 0/10 | 5 | Peeling impossible | Peeling impossible |

Note:
B-1: ETFE (ETFE/E/IAN/CH$_2$=CH(CF$_2$)$_2$F copolymer) within the scope of the present invention
B-2: ETFE (ETFE/E/CAN/CH$_2$=CH(CF$_2$)$_2$F copolymer) within the scope of the present invention
B-3: Electroconductive ETFE (ETFE/E/CAN/CH$_2$=CH(CF$_2$)$_2$F copolymer) within the scope of of the present invention
B-4: ETFE outside the scope of the present invention
B-5: Electroconductive ETFE outside the scope of the present invention
B-6: Mixture of ETFE (ETFE/E/IAN/CH$_2$=CH(CF$_2$)$_2$F copolymer and TFE/E/CH$_2$=CH(CF$_2$)$_2$F copolymer), within the scope of the present invention
B-7: Mixture of electroconductive ETFE (ETFE/E/IAN/CH$_2$=CH(CF$_2$)$_2$F copolymer and TFE/E/CH$_2$=CH(CF$_2$)$_2$F copolymer), within the scope of the present invention maintaining such an effect to improve the interlayer adhesion strength over a long period of time without losing such an effect even when it is soaked in a fuel.

The entire disclosure of Japanese Patent Application No. 2003-095570 filed on Mar. 31, 2003 including specification, claims and summary is incorporated herein by reference in its entirety.

What is claimed is:

1. A multi-layer hose having a multi-layer structure comprising an inner layer (I) made of a fluorocopolymer and an outer layer (II) made of a polyamide resin, wherein the fluorocopolymer constituting the inner layer (I) is a fluorocopolymer which comprises polymerized units (a) based on tetrafluoroethylene, polymerized units (b) based on ethylene and polymerized units (c) based on itaconic anhydride and/or citraconic anhydride, wherein the molar ratio of (a)/(b) is from 20/80 to 80/20 and the molar ratio of (c)/((a)+(b)) is from 1/10,000 to 5/100 and which has a volume flow rate of from 1 to 1,000 mm$^3$/sec., and the polyamide resin constituting the outer layer (II) is polyamide 11 and/or polyamide 12, which satisfies a condition of (terminal amino group concentration)/(terminal carboxyl group concentration)>1.

2. The multi-layer hose according to claim 1, wherein the fluorocopolymer constituting the inner layer (I) is a composition comprising a fluorocopolymer which comprises polymerized units (a) based on tetrafluoroethylene, polymerized units (b) based on ethylene and polymerized units (c) based on itaconic anhydride and/or citraconic anhydride, wherein the molar ratio of (a)/(b) is from 20/80 to 80/20 and the molar ratio of (c)/((a)+(b)) is from 1/10,000 to 5/100 and which has a volume flow rate of from 1 to 1,000 mm$^3$/sec., and an ethylene/tetrafluoroethylene copolymer other than the above fluorocopolymer, in a mass ratio of from 1/99 to 80/20.

3. The multi-layer hose according to claim 1, wherein the fluorocopolymer further contains polymerized units (d) of another monomer which is a compound represented by $CH_2=CX(CF_2)_nY$ (wherein each of X and Y which are independent of each other, is a hydrogen atom or a fluorine atom, and n is from 2 to 4), wherein the content of polymerized units (d) based on such another monomer, is from 0.1 to 10 mol % based on the total polymerized units in the fluorocopolymer.

4. The multi-layer hose according to claim 2, wherein the ethylene/tetrafluoroethylene copolymer comprises polymerized units (a) based on tetrafluoroethylene, polymerized units (b) based on ethylene and polymerized units (d) based on another monomer, wherein the molar ratio of (a)/(b) is from 50/50 to 70/30, said another monomer is a compound represented by $CH_2=CX(CF_2)_nY$ (wherein each of X and Y which are independent of each other, is a hydrogen atom or a fluorine atom, and n is from 2 to 4), and the content of polymerized units (d) based on such another monomer, is from 0.1 to 10 mol % based on the total polymerized units in the ethylene/tetrafluoroethylene copolymer.

5. The multi-layer hose according to claim 1, wherein the polyamide resin constituting the outer layer (II) is polyamide 11 and/or polyamide 12, which satisfies a condition of (terminal amino group concentration)/(terminal carboxyl group concentration)>1, produced by adding a diamine component during the polymerization.

6. The multi-layer hose according to claim 5, wherein the diamine component added during the polymerization is at least one member selected from the group consisting of an aliphatic diamine and an alicyclic diamine.

7. The multi-layer hose according to claim 1, wherein the polyamide resin constituting the outer layer (II) is a resin composition of polyamide 11 and/or polyamide 12, which comprises polyamide 11 and/or polyamide 12, and a plasticizer and/or an impact improver.

8. The multi-layer hose according to claim 1, wherein the surface resistance of the fluorocopolymer constituting the inner layer (I) is at most $10^6$ Ω/square.

9. The multi-layer hose according to claim 1, wherein the fluorocopolymer constitutes the inner most layer of the multi-layer hose and contains an electrical conductivity-imparting filler, wherein the content of the electrical conductivity-imparting filler is from 1 to 30 parts by mass per 100 parts by mass of the fluorocopolymer.

10. The multi-layer hose according to claim 1, wherein the multi-layer hose is formed by coextrusion.

11. The multi-layer hose according to claim 1, which is used as a fuel hose.

12. A method of making a multi-layer hose, the method comprising coextruding a fluoropolymer and a polyamide resin; and
producing the hose of claim 1.

* * * * *